United States Patent
Sammut et al.

(10) Patent No.: US 6,516,699 B2
(45) Date of Patent: Feb. 11, 2003

(54) APPARATUS AND METHOD FOR CALCULATING AIMING POINT INFORMATION FOR RIFLE SCOPES

(75) Inventors: Dennis J. Sammut, Woodside, CA (US); Dickinson Buell, Hayward, CA (US)

(73) Assignee: Horus Vision, LLC, San Bruno, CA (US)

( * ) Notice: Subject to any disclaimer, the term of this patent is extended or adjusted under 35 U.S.C. 154(b) by 0 days.

(21) Appl. No.: 09/882,767

(22) Filed: Jun. 14, 2001

(65) Prior Publication Data

US 2003/0010190 A1 Jan. 16, 2003

Related U.S. Application Data

(63) Continuation-in-part of application No. 09/519,124, filed on Mar. 6, 2000, now Pat. No. 6,453,595, which is a continuation-in-part of application No. 09/129,729, filed on Aug. 5, 1998, now Pat. No. 6,032,374, which is a continuation-in-part of application No. 08/986,458, filed on Dec. 8, 1997, now Pat. No. 5,920,995.

(51) Int. Cl.$^7$ ................................................ F41G 1/38
(52) U.S. Cl. ........................................ 89/41.17; 42/122
(58) Field of Search ...................... 42/84, 122; 73/167; 89/41.03, 41.14, 41.15, 41.16, 41.17, 41.19, 200, 204

(56) References Cited

U.S. PATENT DOCUMENTS

| | | |
|---|---|---|
| 1,190,121 A | 7/1916 | Critchett |
| 2,806,287 A | 9/1957 | Sullivan .......................... 33/50 |
| 3,190,003 A | 6/1965 | O'Brien .......................... 33/50 |
| 3,392,450 A | 7/1968 | Herter et al. .................. 33/50 |
| 3,431,652 A | 3/1969 | Leatherwood .................. 33/50 |
| 3,492,733 A | 2/1970 | Leatherwood .................. 33/50 |
| 3,682,552 A | 8/1972 | Hartman ........................ 356/3 |
| 3,744,133 A | 7/1973 | Fukushima et al. ........... 33/234 |
| 3,782,822 A | 1/1974 | Spence ......................... 356/21 |
| 3,798,796 A | 3/1974 | Stauff et al. ................... 35/25 |
| 3,876,304 A | 4/1975 | Novak .......................... 356/71 |
| 3,902,251 A | 9/1975 | Ross ............................ 33/246 |
| 3,948,587 A | 4/1976 | Rubbert ....................... 356/21 |
| 4,014,482 A | 3/1977 | Esker et al. ................ 244/3.13 |
| 4,247,161 A | 1/1981 | Unertl, Jr. .................... 350/10 |

(List continued on next page.)

FOREIGN PATENT DOCUMENTS

GB 2294133 A * 4/1996 ............. F41G/3/14

OTHER PUBLICATIONS

"TDS Tri–Factor: A Clear Shot; A Clear Kill" bu T.D. Smith Copyright 1992.
Deutsch Optik Catalog, Summer 1997, one page discussing relative merits of optical v. laser rangefinders.

*Primary Examiner*—Michael J. Carone
*Assistant Examiner*—Denise J Buckley
(74) *Attorney, Agent, or Firm*—Medlen & Carroll, LLP

(57) ABSTRACT

An improved shooting system is provided by using a firearm having a telescopic gunsight mounted a predetermined distance above the barrel in conjunction with a computer including a controller, memory; a program stored in memory for calculating targeting information. The computer can be a hand-held, personal digital assistant type device which enables the user to input information regarding weather, gun and ammunition characteristics, and target information, including range to target, and which quickly calculates the adjustments which need to be made to a conventional scope, or the location on the reticle which should be used as an aiming point, in order to hit the target.

16 Claims, 20 Drawing Sheets

U.S. PATENT DOCUMENTS

| | | | | |
|---|---|---|---|---|
| 4,248,496 A | | 2/1981 | Akin, Jr. et al. | 350/10 |
| 4,255,013 A | | 3/1981 | Allen | 350/10 |
| 4,263,719 A | | 4/1981 | Murdoch | 33/297 |
| 4,285,137 A | | 8/1981 | Jennie | 33/246 |
| 4,395,096 A | | 7/1983 | Gibson | 350/560 |
| 4,403,421 A | | 9/1983 | Shepherd | 33/246 |
| 4,408,842 A | | 10/1983 | Gibson | 350/560 |
| 4,497,548 A | | 2/1985 | Burris | 350/560 |
| 4,531,052 A | * | 7/1985 | Moore | 235/404 |
| 4,584,776 A | | 4/1986 | Sheperd | 33/246 |
| 4,627,171 A | | 12/1986 | Dudney | 33/241 |
| 4,777,352 A | | 10/1988 | Moore | 235/404 |
| H613 H | * | 4/1989 | Stello et al. | 235/414 |
| 4,912,853 A | | 4/1990 | McDonnell et al. | 33/228 |
| 4,949,089 A | * | 8/1990 | Ruszkowski, Jr. | 342/357.08 |
| 4,965,439 A | | 10/1990 | Moore | 235/404 |
| 5,194,908 A | * | 3/1993 | Lougheed et al. | 250/332 |
| 5,375,072 A | | 12/1994 | Cohen | 364/561 |
| 5,454,168 A | | 10/1995 | Langner | 33/234 |
| 5,469,414 A | * | 11/1995 | Okamura | 360/75 |
| 5,491,546 A | | 2/1996 | Wascher et al. | 356/4.03 |
| 5,631,654 A | * | 5/1997 | Karr | 250/342 |
| 5,672,840 A | * | 9/1997 | Sage et al. | 345/619 |
| 5,781,505 A | * | 7/1998 | Rowland | 367/124 |
| 6,025,908 A | | 2/2000 | Houde-Walter | 356/153 |
| 6,064,196 A | * | 5/2000 | Oberlin et al. | 324/179 |

* cited by examiner

Sights on at 500 yards. Sights are 3.00 inches above bore.
Angle of Departure = 0.21 deg. (Firing angle = 0 deg.)

| Range (yds) | 50 | 100 | 150 | 200 | 250 | 300 | 350 | 400 | 450 | 500 |
|---|---|---|---|---|---|---|---|---|---|---|
| Traj. (in.) | 3.3 | 8.3 | 12.2 | 14.8 | 16.1 | 16.0 | 14.4 | 11.2 | 6.5 | 0.0 |
| Traj. (MOA) | 6.2 | 8.0 | 7.8 | 7.1 | 6.2 | 5.1 | 3.9 | 2.7 | 1.4 | 0.0 |

| Range (yds) | 550 | 600 | 650 | 700 | 750 | 800 | 850 | 900 | 950 | 1000 |
|---|---|---|---|---|---|---|---|---|---|---|
| Traj. (in.) | −8.2 | −18.4 | −30.5 | −44.6 | −61.0 | −79.7 | −101 | −124 | −151 | −180 |
| Traj. (MOA) | −1.4 | −2.9 | −4.5 | −6.1 | −7.8 | −9.5 | −11.3 | −13.2 | −15.1 | −17.2 |

| Range (yds) | 1050 | 1100 | 1150 | 1200 | 1250 | 1300 | 1350 | 1400 | 1450 | 1500 |
|---|---|---|---|---|---|---|---|---|---|---|
| Traj. (in.) | −212 | −247 | −286 | −328 | −374 | −424 | −477 | −535 | −598 | −665 |
| Traj. (MOA) | −19.3 | −21.5 | −23.7 | −26.1 | −28.6 | −31.1 | −33.8 | −36.5 | −39.4 | −42.4 |

| Range (yds) | 1550 | 1600 | 1650 | 1700 | 1750 | 1800 | 1850 | 1900 | 1950 | 2000 |
|---|---|---|---|---|---|---|---|---|---|---|
| Traj. (in.) | −738 | −816 | −899 | −989 | −1085 | −1187 | −1295 | −1411 | −1533 | −1662 |
| Traj. (MOA) | −45.5 | −48.7 | −52.1 | −55.6 | −59.2 | −63.0 | −66.9 | −70.9 | −75.1 | −79.4 |

| Range (yds) | 2050 | 2100 | 2150 | 2200 | 2250 | 2300 | 2350 | 2400 | 2450 | 2500 |
|---|---|---|---|---|---|---|---|---|---|---|
| Traj. (in.) | −1799 | −1942 | −2093 | −2252 | −2418 | −2592 | −2774 | −2965 | −3163 | −3370 |
| Traj. (MOA) | −83.8 | −88.3 | −93.0 | −97.8 | −102.6 | −107.6 | −112.8 | −118.0 | −123.3 | −128.7 |

Hunting Shack 750 Gr AMAX Match .50 BMG
(Calculated using Ingalls' table)

| Bullet Weight | 750 grains | Bullet Caliber | 0.500 |
| Sectional Density | 0.429 | Coefficient of Form | 0.571 |
| Effective Bal. Coeff | 0.750 | Bal. Coeff at STP | 0.750 |
| Cross wind | 10.0 m.p.h. | Altitude | 0 Ft. |
| Atmospheric pressure | 30.00 in. | Temperature | 60.0 F |

| Range yards | Velocity f.p.s. | Energy ft-lb. | Momentum lb.-sec. | Mx. Ord. in. | Defl. in. | Drop in. | Lead in/mph | Time sec. |
|---|---|---|---|---|---|---|---|---|
| 0 | 2800 | 13054.6 | 9.3247 | 0.0 | 0.0 | 0.0 | 0.0 | 0.000 |
| 50 | 2736 | 12468.5 | 9.1130 | 0.1 | 0.1 | 0.6 | 1.0 | 0.054 |
| 100 | 2674 | 11903.1 | 8.9040 | 0.6 | 0.4 | 0.6 | 1.9 | 0.110 |
| 150 | 2612 | 11357.7 | 8.6976 | 1.3 | 1.0 | 2.3 | 2.9 | 0.166 |
| 200 | 2551 | 10833.0 | 8.4943 | 2.4 | 1.8 | 5.2 | 4.0 | 0.225 |
| 250 | 2491 | 10329.2 | 8.2945 | 3.9 | 2.8 | 9.4 | 5.0 | 0.284 |
| 300 | 2432 | 9845.5 | 8.0979 | 5.7 | 4.1 | 15.0 | 6.1 | 0.345 |
| 350 | 2374 | 9381.1 | 7.9046 | 8.0 | 5.7 | 21.9 | 7.2 | 0.407 |
| 400 | 2317 | 8935.5 | 7.7146 | 10.7 | 7.5 | 30.4 | 8.3 | 0.471 |
| 450 | 2260 | 8508.0 | 7.5278 | 13.9 | 9.6 | 40.3 | 9.5 | 0.537 |
| 500 | 2205 | 8098.0 | 7.3442 | 17.6 | 12.0 | 51.9 | 10.6 | 0.604 |
| 550 | 2151 | 7705.0 | 7.1637 | 21.8 | 14.7 | 65.2 | 11.8 | 0.673 |
| 600 | 2098 | 7328.3 | 6.9864 | 26.7 | 17.7 | 80.2 | 13.1 | 0.744 |
| 650 | 2046 | 6967.3 | 6.8122 | 32.1 | 21.1 | 97.2 | 14.4 | 0.816 |
| 700 | 1994 | 6621.6 | 6.6410 | 38.2 | 24.7 | 116.1 | 15.7 | 0.890 |
| 750 | 1944 | 6290.6 | 6.4729 | 45.1 | 28.7 | 137.1 | 17.0 | 0.966 |
| 800 | 1894 | 5973.7 | 6.3078 | 52.7 | 33.0 | 160.3 | 18.4 | 1.045 |
| 850 | 1845 | 5670.5 | 6.1456 | 61.2 | 37.7 | 185.7 | 19.8 | 1.125 |
| 900 | 1798 | 5380.5 | 5.9864 | 70.5 | 42.8 | 213.6 | 21.2 | 1.207 |
| 950 | 1751 | 5104.6 | 5.8309 | 80.7 | 48.2 | 244.1 | 22.7 | 1.292 |
| 1000 | 1705 | 4842.8 | 5.6794 | 92.0 | 54.1 | 277.2 | 24.3 | 1.379 |
| 1050 | 1661 | 4594.5 | 5.5319 | 104.4 | 60.3 | 313.2 | 25.8 | 1.468 |
| | | | | | | 352.2 | | |

| FIG. 8A |
| FIG. 8B |

FIG. 8

| | | | | | | | |
|---|---|---|---|---|---|---|---|
| 1100 | 1618 | 4358.9 | 5.3882 | 117.9 | 67.0 | 394.3 | 27.4 | 1.559 |
| 1150 | 1576 | 4135.4 | 5.2482 | 132.6 | 74.1 | 439.7 | 29.1 | 1.653 |
| 1200 | 1535 | 3923.3 | 5.1119 | 148.6 | 81.7 | 488.7 | 30.8 | 1.750 |
| 1250 | 1495 | 3722.1 | 4.9791 | 166.1 | 89.7 | 541.3 | 32.5 | 1.849 |
| 1300 | 1456 | 3531.3 | 4.8498 | 185.0 | 98.1 | 597.8 | 34.3 | 1.950 |
| 1350 | 1418 | 3350.2 | 4.7238 | 205.4 | 107.1 | 658.3 | 36.2 | 2.055 |
| 1400 | 1382 | 3178.4 | 4.6011 | 227.6 | 116.5 | 723.2 | 38.0 | 2.162 |
| 1450 | 1346 | 3016.8 | 4.4826 | 251.5 | 126.4 | 792.6 | 40.0 | 2.272 |
| 1500 | 1312 | 2867.1 | 4.3700 | 277.4 | 136.9 | 866.9 | 42.0 | 2.385 |
| 1550 | 1280 | 2728.4 | 4.2629 | 305.4 | 147.8 | 946.3 | 44.0 | 2.500 |
| 1600 | 1249 | 2599.4 | 4.1610 | 335.5 | 159.3 | 1031.1 | 46.1 | 2.619 |
| 1650 | 1220 | 2479.7 | 4.0640 | 367.9 | 171.2 | 1121.4 | 48.2 | 2.741 |
| 1700 | 1193 | 2371.7 | 3.9745 | 402.8 | 183.7 | 1217.7 | 50.4 | 2.865 |
| 1750 | 1169 | 2274.7 | 3.8924 | 440.2 | 196.6 | 1320.3 | 52.7 | 2.992 |
| 1800 | 1146 | 2187.0 | 3.8166 | 480.5 | 210.0 | 1429.2 | 54.9 | 3.122 |
| 1850 | 1125 | 2107.4 | 3.7465 | 523.7 | 223.8 | 1544.7 | 57.3 | 3.254 |
| 1900 | 1105 | 2034.6 | 3.6812 | 569.8 | 238.1 | 1666.9 | 59.6 | 3.388 |
| 1950 | 1087 | 1967.8 | 3.6203 | 618.7 | 252.7 | 1795.9 | 62.0 | 3.525 |
| 2000 | 1070 | 1906.2 | 3.5632 | 670.5 | 267.8 | 1931.9 | 64.5 | 3.664 |
| 2050 | 1054 | 1849.2 | 3.5095 | 725.3 | 283.2 | 2075.0 | 67.0 | 3.805 |
| 2100 | 1039 | 1796.3 | 3.4590 | 783.0 | 299.0 | 2225.5 | 69.5 | 3.949 |
| 2150 | 1024 | 1747.1 | 3.4112 | 843.8 | 315.2 | 2383.3 | 72.1 | 4.094 |
| 2200 | 1011 | 1701.0 | 3.3660 | 907.7 | 331.7 | 2548.7 | 74.7 | 4.242 |
| 2250 | 998 | 1657.9 | 3.3231 | 974.8 | 348.6 | 2721.9 | 77.3 | 4.391 |
| 2300 | 986 | 1617.5 | 3.2822 | 1045.0 | 365.8 | 2902.8 | 79.9 | 4.542 |
| 2350 | 974 | 1579.4 | 3.2433 | 1118.4 | 383.3 | 3091.8 | 82.6 | 4.695 |
| 2400 | 963 | 1543.4 | 3.2062 | 1195.0 | 401.2 | 3289.0 | 85.4 | 4.850 |
| 2450 | 952 | 1508.7 | 3.1699 | 1274.8 | 419.3 | 3494.2 | 88.1 | 5.007 |

FIG. 8B

APPARATUS AND METHOD FOR CALCULATING AIMING POINT INFORMATION FOR RIFLE SCOPES

RELATED APPLICATIONS

This application is a continuation-in-part of U.S. patent application Ser. No. 09/519,124 filed Mar. 6, 2000, now U.S. Pat. No. 6,453,595 which is a continuation in part of Ser. No. 09/129,729 filed Aug. 5, 1998, now U.S. Pat. No. 6,032,374 which issued on Mar. 7, 2000, which is a continuation in part of Ser. No. 08/986,458 filed Dec. 8, 1997 now U.S. Pat. No. 5,920,995 which issued on Jul. 13, 1999.

BACKGROUND OF THE INVENTION

The present invention relates to telescopic gunsights, and more particularly to telescopic gunsights and associated equipment used to achieve shooting accuracy at extreme ranges.

All shooters, whether they are police officers, olympic shooters, or weekend enthusiasts, have one common goal: hitting their target accurately and consistently. Accuracy and consistency in shooting depend largely on the skill of the shooter and the construction of the firearm and ammunition.

The accuracy of a firearm can be enhanced by the use of precisely-made components, including precisely-made ammunition. It is well known in target shooting that using ammunition in which the propellant weight and type, bullet weight and dimensions, and cartridge dimensions are held within very strict limits, can improve accuracy in shooting.

At very long ranges, in excess of 500 yards, however, the skill of the shooter and the consistency of the ammunition is often not enough to insure that the shooter will hit the target. As range increases, other factors can affect the flight of the bullet and the point of impact down range. One of these factors is "bullet drop". "Bullet drop" is caused by the influence of gravity on the moving bullet, and is characterized by a bullet path which curves to earth over long ranges. Therefore to hit a target at long range, it is necessary to elevate the barrel of the weapon, and the aiming point, to adjust for bullet drop. Other factors, such as wind, magnus effect (i.e., a lateral thrust exerted by wind on a rotating bullet whose axis is perpendicular to the wind direction), bullet design, and the idiosyncracies of the weapon can cause the bullet to drift to the left or right of the central path of the bullet over long range. Such effects are generally referred to as "windage" effects. Therefore, to hit a target at long range, it may be necessary to correct for windage by moving the barrel of the weapon slightly to the left or the right to compensate for bullet drift. Thus, in order to hit a target at long range, the shooter must see the target, accurately estimate the range to the target, estimate the effect of bullet drop and wind on the bullet, and use this information to properly position the barrel of the firearm prior to squeezing the trigger.

Conventional telescopic gunsights or scopes are not generally useful at long ranges in excess of 600–800 yards. The cross-hairs of such scopes are typically located in the center of the field, with the vertical hair providing a central indicator for making a windage adjustment, and the horizontal hair providing a central indicator for making a bullet drop adjustment. Modifications to this basic system have not, thus far, enabled a skilled shooter firing at long ranges to acquire and hit a target quickly and reliably, regardless of the weapon used (assuming always that the weapon is capable of reaching a target at the desired long range).

For example, U.S. Pat. No. 1,190,121 to Critchett, discloses a reticle for use in a rifle scope containing a rangefinder having markings for finding a range with reference to the height of a man. Apparently because of the innate variation in the height of any given individual from that used to produce the reticle, and the resulting inaccuracy which would produce at long ranges, Critchett's scope was only useful to 600 yards.

U.S. Pat. No. 3,948,587 to Rubbert discloses a reticle and telescope gunsight system having primary cross-hairs which intersect conventionally at the center of the field, and secondary horizontal cross-hairs spaced apart by different amounts to form a rangefinder and distinct aiming apertures and points, based upon a predetermined, estimated size of a target. Rubbert's preferred embodiment is constructed for use in shooting deer having an 18" chest depth. However, like Critchett, the usefulness of Rubbert for shooting other targets of varying size at long range is doubtful.

U.S. Pat. No. 3,492,733 to Leatherwood discloses a variable power scope having aiming cross-hairs and two upper cross-hairs for bracketing a target of known dimensions at a known distance. The scope is mounted to a gun barrel, and the position of the scope in relation to the gun barrel is adjustable up and down to compensate for bullet drop by covering the target with the bracketing cross-hairs, and rotating an adjustment ring to expand or contract the bracketing cross-hairs to bracket the target. Leatherwood's scope, like the others discussed above, has limited utility at long ranges because it is designed with a specific size target in mind, and would therefore be inaccurate when used with targets of widely varying size, and also because at long range the scope may not be able to move sufficiently in relation to the barrel (i.e., may be obstructed by the gun barrel).

U.S. Pat. No. 4,403,421 to Shepherd discloses a scope having a primary and secondary reticles, the secondary reticle being a polygonal reticle with different indicia on the different faces which can be rotated into position to compensate for bullet drop and determining target range for different sized targets. However, having to rotate a secondary reticle to locate an appropriate target shape in order to determine the range is time consuming and undesirable, since it takes the shooter's attention away from the target.

It should be noted that the range finding inaccuracies inherent in these prior art references may be resolved using a laser rangefinder. However, since a laser rangefinder often emits a visible light, there is always the possibility that the beam from a laser rangefinder could be detected, revealing the position of the shooter, causing a live target to move, or other undesirable consequences, before the shot can be taken. Furthermore, a laser rangefinder includes complex electronics which must be handled with care. Laser rangefinders require highly reflective or broadside targets to achieve range. Finally, a laser rangefinder must be powered with electricity from a source which must be carried by the shooter. The additional weight is a burden, and the possibility exists that power source could fail or become exhausted through use, causing the rangefinder to cease working.

Accordingly, the need exists for a telescopic gun sight having a reticle which includes an optical rangefinder which permits a skilled shooter to rapidly and accurately identify the range to any target of estimable size, no matter how large or small, to make fast and accurate adjustment for bullet drop and windage, using the shooter's knowledge and experience and without the need to move rings or make adjustments to the scope, thus enabling the shooter to accurately hit targets at any range, depending upon the eyesight of the shooter and the maximum range of the selected firearm.

SUMMARY OF THE INVENTION

In one embodiment, the present invention provides an improved telescopic gunsight having a housing, including a means for mounting the housing in a fixed, predetermined position relative to a gun barrel, an objective lens mounted in one end the housing, an ocular lens mounted in the opposite end of the housing, a reticle mounted in the housing between the objective lens and the ocular lens, the reticle having an optical center, a primary vertical cross-hair intersecting the optical center of the reticle, a primary horizontal cross-hair intersecting said primary vertical cross-hair at a position above the optical center when the housing is mounted to the gun barrel, to form an upper right quadrant, an upper left quadrant, a lower left quadrant, and a lower right quadrant, a plurality of secondary horizontal cross-hairs evenly spaced along the primary vertical cross-hair, a plurality of secondary vertical cross-hairs evenly spaced along at least some of said secondary horizontal cross-hairs, and rangefinder markings positioned in one of the quadrants. The telescopic gunsight of this embodiment can be a fixed power scope or a variable power scope. When optics are mounted in the housing to permit the power to be varied along a predetermined range, the reticle is most preferably mounted between the objective lens and the variable power optics.

In another embodiment, the present invention provides a reticle for use in any conventional telescopic gunsight, whether such telescopic gunsight is a fixed power scope or a variable power scope. A reticle of this embodiment is preferably constructed from an optically transparent wafer or disc having an optical center which coincides with a center of a field of vision when the wafer is mounted in a scope. A primary vertical cross-hair having a predetermined thickness bisects the disc, intersecting the optical center of the disc. A primary horizontal cross-hair having a predetermined thickness intersects the primary vertical cross-hair, most preferably above the optical center of the disc, to form an upper right quadrant, an upper left quadrant, a lower left quadrant, and a lower right quadrant. A plurality of secondary horizontal cross-hairs having predetermined thickness are evenly spaced along the primary vertical cross-hair. Preferably, at least some of these secondary horizontal cross-hairs are identified with a unique identifier, to aid the shooter in calibrating the horizontal cross-hairs by range and in locating the appropriate horizontal cross-hair to use in selecting an aiming point. A plurality of secondary vertical cross-hairs having predetermined thickness are evenly spaced along at least some of said secondary horizontal cross-hairs to aid in making accurate windage adjustments. Finally, a separate range-finding means can be positioned in one of said quadrants to aid the shooter in determining the range to target.

The present invention can also be adapted for use in a mid-range telescopic gunsight. A mid-range reticle, almost identical to the long-range reticle described above, can be constructed in accordance with this invention. Since the mid-range reticle requires less lower field area, the primary horizontal cross-hair can be conventionally centered. The mid-range reticle can then be calibrated and used in the same manner as a long-range reticle.

The reticle can also be provided with a circumscribing ring visible through the gunsight, to aid in centering the eye relative to the telescopic gunsight. This ring helps reduce shooting inaccuracy caused by the misalignment of the shooter's line of sight through the scope. By providing a visual means to align the reticle within the scope, the shooter can produce more accurate and more repeatable results.

The reticle can also be provided with an aiming/centering dot located at the optical center of the reticle for rapid acquisition of a target at medium range, and for aiding the shooter in centering his eye relative to the field of view.

In yet another embodiment, a portion of the primary vertical cross-hair or the primary horizontal cross-hair can be provided with rangefinder markings to eliminate the need for a separate rangefinder in one of the quadrants formed by the primary vertical and horizontal cross-hair.

In yet another embodiment, the reticle can be calibrated automatically by using a computer containing a ballistics program which receives information regarding external information (such as temperature, relative humidity, barometric pressure, wind speed, wind direction, slope of the ground over which the bullet will travel, target speed, and range to target) and information regarding the weapon and bullet used (type of scope/reticle, distance of scope above gun barrel, bullet weight, ballistic coefficient of bullet, muzzle velocity of cartridge, range at which weapon was zeroed). The output of the program can be selected to produce a targeting grid for calibrating a reticle of the present invention, or for providing aiming point information for a specific target at a known range, whether the scope/reticle is a conventional scope/reticle in which the scope is adjusted to hit a target at range by rotating horizontal and vertical adjustment knobs the calculated number of "clicks" or whether the scope contains a reticle of the present invention in which the specific aiming point for the target is identified by reference to the calibrated secondary horizontal and vertical cross-hairs.

Other embodiments will be evident from a consideration of the drawings taken together with the detailed description of the invention.

BRIEF DESCRIPTION OF THE DRAWINGS

A better understanding of the invention and its advantages will be apparent from the detailed description taken in conjunction with the accompanying drawings in which:

FIG. 5 is an example of 500 yard zero ballistic table created for a .50 Cal. Bolt Action Model M-93 Rifle having a 30 inch barrel built firing a .50 Cal Browning Machine Gun cartridge;

FIG. 8 is an illustrative table providing data for determining an appropriate windage adjustment for the example;

DETAILED DESCRIPTION OF THE INVENTION

Figure 1:
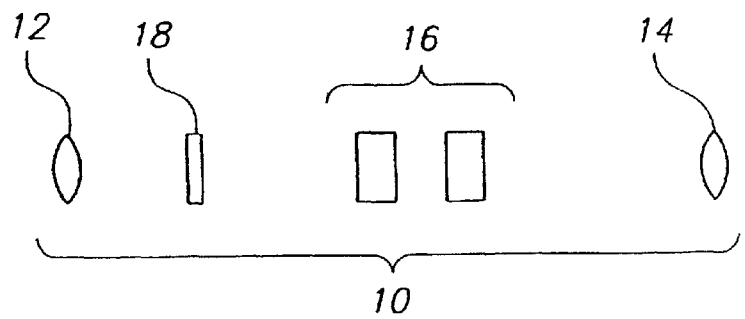
FIG. 1 is a diagram showing the optical components of a telescopic gunsight of the present invention.
Figure 4:
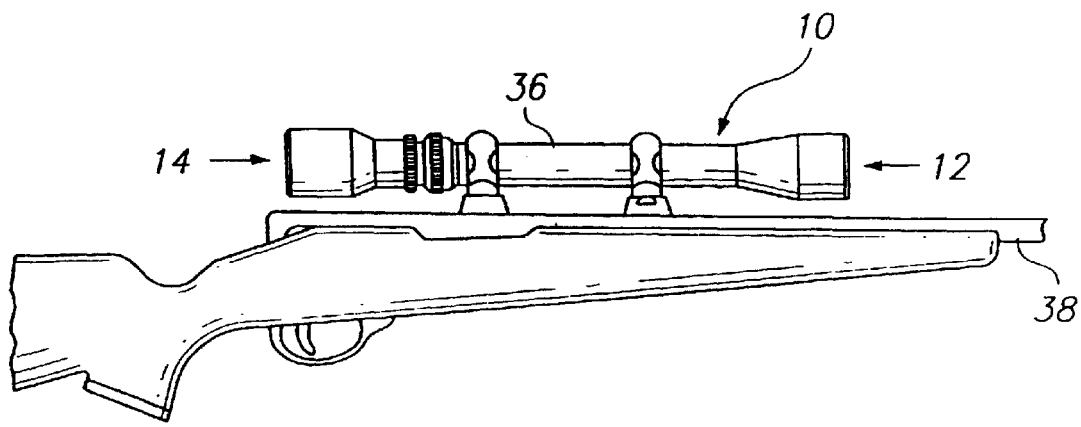
FIG. 4 is a partial side view of a firearm showing a telescopic gunsight mounted on the barrel.

As shown in FIGS. 1 and 4, a telescopic gunsight 10 (also referred to herein as a "scope") includes a housing 36 which can be mounted in fixed relationship with a gun barrel 38. Housing 36 is preferably constructed from steel or aluminum, but can be constructed from virtually any durable, substantially non-flexible material which is useful for constructing optical equipment. Mounted in housing 36 at one end is an objective lens or lens assembly 12. Mounted in housing 38 at the opposite end is an ocular lens or lens assembly 14. It is well known in the art to make such lenses from either a single piece of glass or other optical material (such as transparent plastic) which has been conventionally ground and polished to focus light, or from two or more pieces of such material mounted together with optically transparent adhesive and the like to focus light. Accordingly, the term "lens" as used herein is intended to cover either a lens constructed from a single piece of optical glass or other material capable of focusing light, or from more than one pieces mounted together to focus light. As will be understood by one having skill in the art, when the scope 10 is mounted to a gun barrel 38, the objective lens 12 faces the target, and the ocular lens 14 faces the shooter's eye.

Other optical components which may be included in housing 36 include variable power optical components 16 for a variable power scope. Such components 16 typically include magnifiers and erectors. Such a variable power scope permits the user to select a desired power within a predetermined range of powers. For example, with a 3–12× 50 scope, the user can select a lower power (i.e., 3×50) or a high power (i.e., 12×50) or any power along the continuous spectrum in between.

Figure 3:
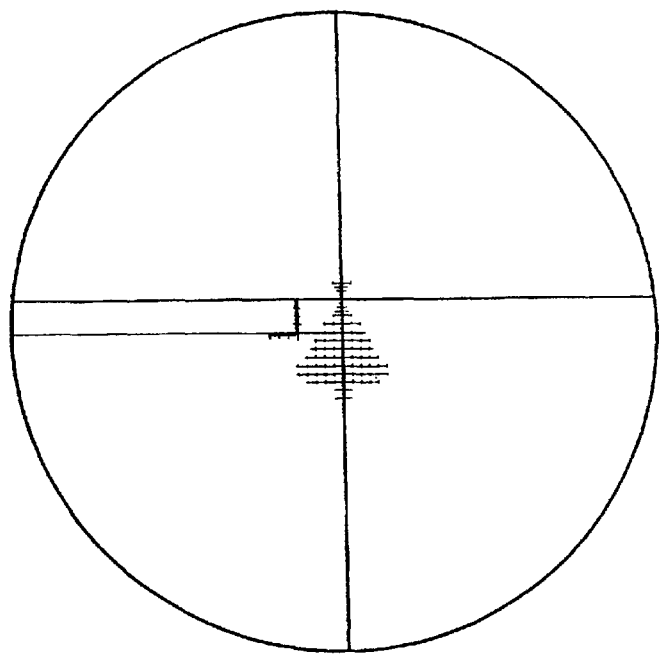
FIG. 3 is a front view of a reticle of the present invention, showing the markings as viewed through a zoom telescopic gunsight at low power.

Finally, a reticle is typically included to assist the shooter in hitting the target. The reticle is typically (but not necessarily) constructed using optical material, such as optical glass or plastic, and takes the form of a disc or wafer with substantially parallel sides. In a fixed power scope, the reticle can be mounted anywhere between the ocular lens 14 and the objective lens 12. In a variable power scope, the reticle is most preferably mounted between the objective lens 12 and the optical components 16. In this position, the apparent size of the reticle when viewed through the ocular lens will vary with the power; for example, compare FIG. 2 (high power) with FIG. 3 (low power). When a reticle of the present invention is mounted in a variable power scope, I prefer a variable power scope manufactured by Schmidt & Bender GmbH & Co. KG of Biebertal, Germany, because of its excellent optics. With a Schmidt & Bender Scope, such as a 3–12×50 or a 4–16×50, when the reticle is mounted between the objective lens and the variable power optical components 16, I have found that the selected aiming point (as described in more detail below) on my reticle does not vary as the shooter zooms the scope in and out to find the most desirable power for a particular shot.

Figure 2:
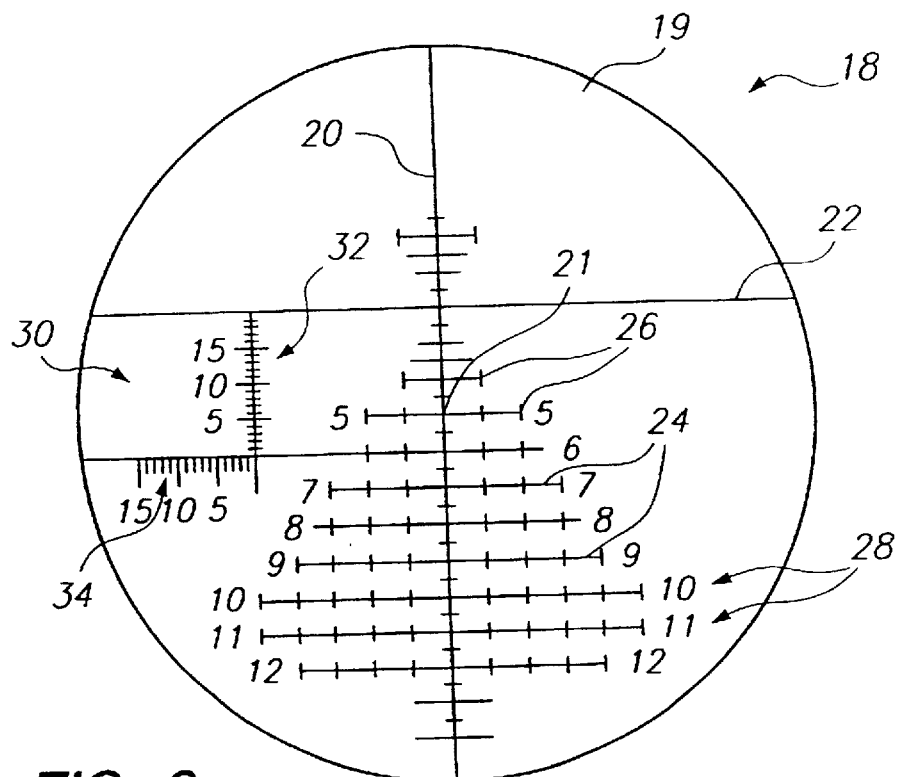
FIG. 2 is a front view of a reticle of the present invention, showing the markings as viewed through a zoom telescopic gunsight at high power, the spacing of the markings based upon an "inch of angle" scale.
Figure 9:
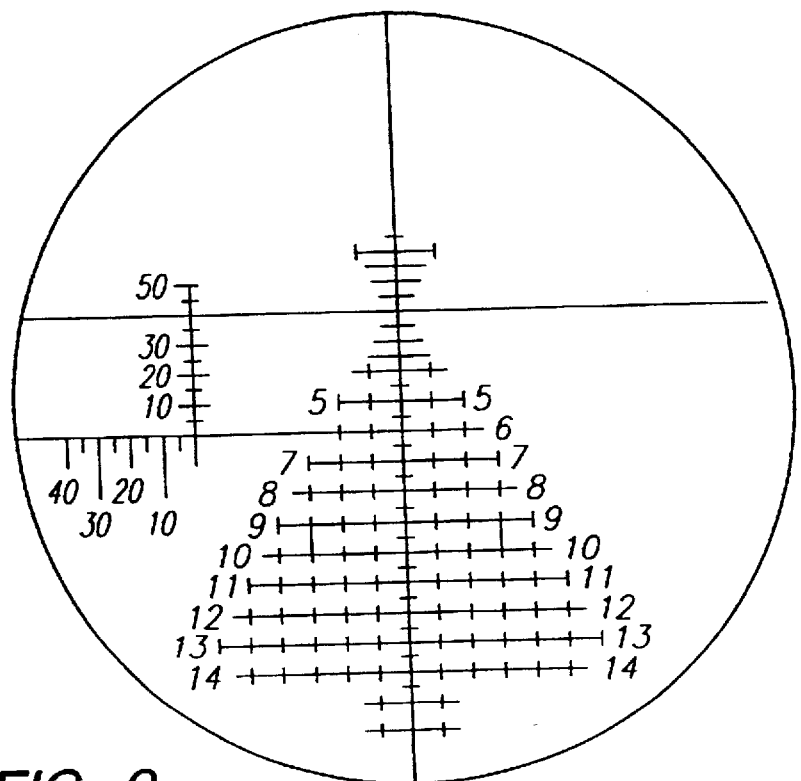
FIG. 9 is a reticle of the present invention based upon a "centimeter of angle" scale.

As shown in FIG. 2, a preferred reticle 18 of the present invention is formed from a substantially flat disc or wafer 19 formed from substantially transparent optical glass or other material suitable for manufacturing optical lenses. Disc 19 has two, substantially parallel, sides. A primary vertical cross-hair 20 is provided on one side of said disc 19 using conventional methods such as, for example, etching, printing, or applying hairs or wires of known diameter. Etching is preferred. Primary vertical cross-hair 20 preferably bisects the disc 19 and intersects the optical center 21 of reticle 18. A primary horizontal cross-hair 22 is also provided, and most preferably intersects the primary vertical cross-hair at a position well above the optical center 21. Positioning the primary horizontal cross-hair in this way provides the necessary additional field of view necessary to shoot accurately at long ranges. Thus, the primary vertical cross-hair and the primary horizontal cross-hair form four quadrants: an upper right quadrant, an upper left quadrant, a lower left quadrant, and a lower right quadrant, when viewed through a scope properly mounted to a gun barrel as shown in FIG. 4.

A plurality of evenly-spaced, secondary horizontal cross-hairs 24 are provided along the primary vertical cross-hair 20, preferably both above and below the primary horizontal cross-hair 22 to aid in range adjustments and for locating an appropriate aiming point on the reticle with respect to the distance to the target. Some of these secondary, horizontal cross-hairs are provided with unique symbols 28 which are useful in quickly locating a particular horizontal cross-hair. Symbols 28 can be numbers, as shown in FIG. 2, letters or other symbols. Symbols 28 are used for identification purposes only.

A plurality of evenly-spaced, secondary vertical cross-hairs or hash-marks 26 are provided on at least some of the secondary horizontal cross-hairs 24, to aid the shooter in making adjustments for windage and for locating an appropriate aiming point on the reticle with respect to both windage and range.

Also provided on the reticle is a means for determining range. As shown in FIG. 2, the rangefinder 30 can be provided in one of the quadrants formed by the primary vertical and horizontal cross-hairs, and can include a vertical arm 32 and an intersecting horizontal arm 34. Vertical arm 32 is provided with a plurality of evenly-spaced horizontal cross-hairs which intersect vertical arm 32; horizontal arm 34 is provided with a plurality of evenly-spaced, preferably downwardly extending cross-hairs. At least some of the range finding cross-hairs are marked to correspond to a scale useful for determining range.

The spacing between the range-finding cross-hairs can be based upon a non-conventional scale, which I refer to as the "inches of angle" scale. An "inch of angle" is defined as the angle made (or the distance on the reticle) which covers exactly one inch at 100 yards. On the reticle shown in FIG. 2, an inch of angle is the distance between any two adjacent rangefinder cross-hairs. That is, the space between any two adjacent rangefinder cross-hairs will cover or exactly contain a one-inch target at 100 yards. A similar scale for metric shooters, which I call a "centimeters of angle" scale, can also be used, with a centimeter of angle being the distance on the reticle which covers exactly one centimeter at 100 meters. Conventional scales, such as the "minute of angle" scale or Mil Radian scale, can also be used, although they are less intuitive to use and make the accurate estimation of long ranges more difficult.

The spacing between secondary cross-hairs on the primary vertical and horizontal cross-hairs are also determined with reference to the scale used for the rangefinder. For the reticle as shown in FIG. 2, it can be seen by reference to the rangefinder that the spacing between the secondary horizontal cross-hairs labeled 5 and 6 is 5 inches of angle. A shorter secondary horizontal cross-hair (or hash-mark) appears between horizontal cross-hairs 5 and 6, at a position 2.5 inches of angle from either secondary horizontal cross-hair 5 or 6. The secondary vertical cross-hairs 26, as shown in FIG. 2, are spaced apart by 5 inches of angle.

The thickness of the lines are also preferably determined with reference to the range-finding scale used. For the preferred embodiment shown in FIG. 2, the preferred thickness of the primary vertical cross-hair 20 and primary horizontal cross-hair 22 is 0.5 inches of angle and the preferred thickness of the secondary horizontal and vertical cross-hairs are 0.25 inches of angle. The rangefinder arms 32, 34 and the marked (5, 10, 15) rangefinder cross-hairs are preferably 0.25 inches of angle thick, and the intermediate range-finding cross-hairs are preferably 0.1 inches of angle thick.

Figure 13:
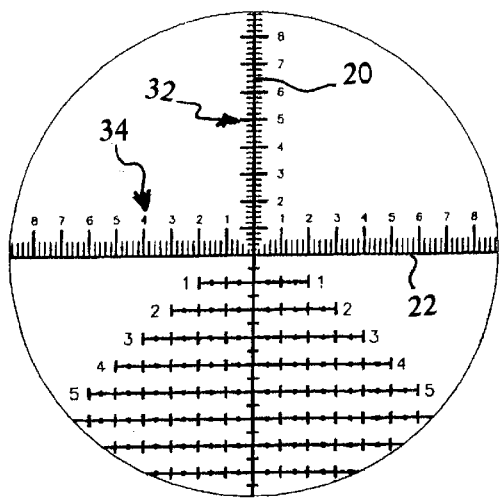
FIG. 13 is a front view of a reticle of the present invention in which the upper portion of the primary vertical cross-hair and the primary horizontal cross-hair have been provided with range-finder markings of a USMC mil-dot scale.
Figure 14:
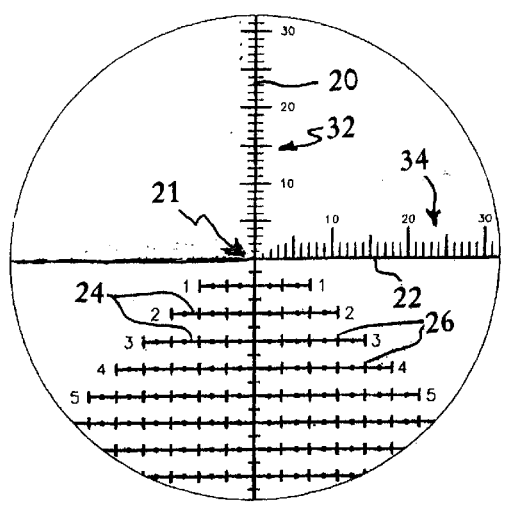
FIG. 14 is a front view of a reticle of the present invention in which the upper portion of the primary vertical cross-hair and the primary horizontal cross-hair have been provided with range-finder markings of an "inches of angle" scale.
Figure 15:
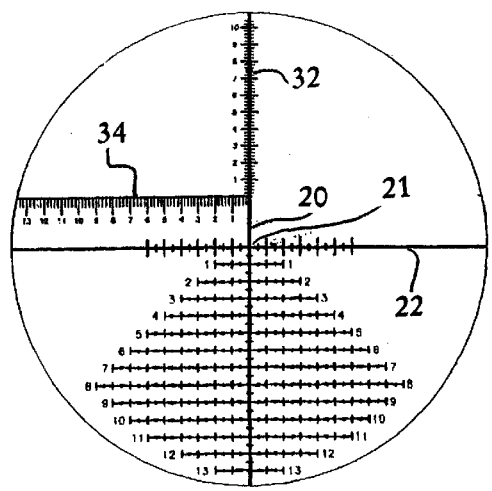
FIG. 15 is a front view of a reticle of the present invention in which a horizontal range-finder bar intersects the primary vertical cross-hair at a position above the intersection with the primary horizontal cross-hair, and primary vertical cross-hair and horizontal rangefinder bar have been provided with range-finder markings of any desirable scale.

As shown in FIGS. 13–15, I have also found it possible to use the primary vertical cross-hair 20 and/or primary horizontal cross-hair 22 as the rangefinder, obviating the need for additional lines in any quadrant formed by the intersecting primary vertical and horizontal cross-hairs. This is preferred because it provides a less cluttered, and therefore less distracting, field of view.

As shown in FIG. 13, the upper portion of the primary vertical cross-hair 20 can be provided with range finder markings of any scale to form a rangefinder vertical arm 32. Likewise, substantially the entire primary horizontal cross-hair 22 can be provided with range finder markings of any scale to form a rangefinder horizontal arm 34. Typical scales include the "inches of angle" or "centimeters of angle" scale introduced by the parent and grandparent applications from which this application claims priority, as well as conventional scales such as USMC Mil Dot Scale or minute of angle scales can also be used.

As shown in FIG. 14, the rangefinder horizontal arm 34 can be superimposed over only a portion of the primary horizontal cross-hair 22. Although FIG. 14 illustrates an example where the rangefinder horizontal arm 34 is located to the right of the intersection 21 between the primary vertical cross-hair 20 and the primary horizontal cross-hair 22, one skilled in the art will realize that the rangefinder horizontal arm 34 could just as easily be located to the left of interesection 21. The scale on the rangefinder markings can, if desired, be drawn to a different scale from that provided for the line thickness and spacing between the secondary vertical cross-hairs 26 and secondary horizontal cross-hairs 24. For example, it may be desirable for an experienced shooter to provide the rangefinder markings in an inches of angle scale to speed up the process of determining the range to target, and then have the spacing between the secondary horizontal cross-hairs 24 and secondary vertical cross-hairs 26 provided in a more conventional (and hence more familiar) scale that the experienced shooter can use to calibrate and shoot the weapon, such as, for example, a USMC Mil Dot Scale.

It is also possible to superimpose only one arm of the rangefinder on either the primary vertical cross-hair 20 or the primary horizontal cross-hair 22. As shown in FIG. 15, the rangefinder vertical arm 32 can be superimposed over the primary vertical cross-hair 32 with a rangefinder horizontal arm 34 extending into an upper quadrant and intersecting the primary vertical cross-hair 20 at a position above intersection 21. Although FIG. 15 shows the rangefinder horizontal arm 34 extending into the upper left quadrant, it could just as easily be positioned in the upper right quadrant. Likewise, the rangefinder horizontal arm 34 could be superimposed over the primary horizontal cross-hair 22 and a rangefinder vertical arm 32 could intersect the primary horizontal cross-hair 22 at a position to the left or to the right of intersection 21 and extend upwards into the left or right quadrants.

To use a scope and reticle of the present invention, it is preferred that the shooter become familiar with the characteristics of the weapon and ammunition to be used. The scope and reticle can be calibrated to work with almost any type of rifle.

Manual Calibration of the Scope and Reticle

To calibrate the scope and reticle, the shooter first determines the ballistics based upon the characteristics of the weapon and ammunition to be used. For example, let us suppose the weapon to be used is a .50 caliber Bolt Action Rifle, Model M-93 with a 30 inch barrel built by Harris Gunworks in Phoenix, Ariz. The cartridge selected is .50

Browning Machine Gun cartridge, each of which is constructed from a brass case (made by Winchester), primer (CCI #35); powder (218 grains ACC #8700 by Accurate Arms Powder), and bullet (750 grain AMAX Match bullet by Hornady, ballistic coefficient 0.750). Any conventional computer based ballistics program can then be used to determine bullet drop for this weapon/ammunition combination, such as, for example, the program written by W. R. Frenchu entitled "Ballistic V.4.0" which was copyrighted 1988 and is based upon Ingalls' table, or "Ballistic Explorer for Windows," sold by Oehler Research of Austin, Tex., and range values for secondary horizontal cross-hairs and cross-wind offset values for secondary vertical cross-hairs calculated manually.

The first step requires the user to zero the selected weapon by firing at a target of known size at a known distance from the muzzle of the gun. For example, if the user decides to zero the weapon at 500 yards, a target of known size is placed exactly 500 yards away (preferably using a measuring device, such as a steel tape, to be certain the distance is accurate), and typically 3–5 shots are fired at the target using the intersection of the primary horizontal and primary vertical cross-hairs as the aiming point. If a 5 inch (or smaller) group in the center of the target is produced, the rifle is zeroed. If the group is significantly larger, there may be a problem with the rifle, the ammunition, or existing weather conditions. If the group is correctly sized, but above, below, to the right or to the left of center of the bullseye, the windage and elevation knobs of the scope are adjusted and the process repeated until the group is centered as desired using the intersection of the primary horizontal and primary vertical cross-hairs as the aiming point. Once the weapon has been zeroed, there will be no further need to change the windage and elevation knobs of the scope, since a user can simply select the correct aiming point for the range to a target by using the reticle markings.

Next, the shooter "calibrates" the cross-hair markings on the reticle. See, e.g., FIG. 5, which provides a table with a zero at 500 yards. Other tables can be calculated with zero values at other ranges. 500 yards has been selected here solely for the purposes of illustration. To assist the shooter in understanding how to manually "calibrate" the reticle, a worksheet, such as that illustrated in FIG. 6 can be used.

Next, the shooter can select the size of the bulls eye (or target area) to be hit using a reticle of the present invention. For example, a selected bulls eye could be 6 5 inches in diameter, 10 inches in diameter, 12 inches, 36 inches, 48 inches etc. A hit anywhere in the bulls eye counts as a direct hit. For the purposes of this example, I used a 12 inch bulls eye from a range of point blank to 1000 yards and a 36 inch bulls eye from 1100 yards to 1650 yards.

When the shooter sees the reticle through the eyepiece, the secondary horizontal cross-hairs can be seen. In this example, the cross-hairs are evenly spaced 2.5 inches of angle apart. Thus, the spacing between the primary horizontal cross-hair 22 shown in FIG. 2, and the first secondary horizontal cross-hair below the primary horizontal cross-hair 22 is 2.5 inches of angle. The spacing between the primary horizontal cross-hair 22 and the secondary horizontal cross hair labeled "5" is 15 inches of angle. This means that adjacent cross-hairs would span a 2.5 inch target at 100 yards. The space between the primary horizontal cross-hair and the secondary horizontal cross-hair labeled "5" would cover a 15 inch target at 100 yards. At 200 yards, adjacent cross- hairs will span a target of 5 inches, and the space between the primary horizontal cross-hair and the secondary cross-hair labeled "5" would cover a 30 inch target. At 600 yards, adjacent cross-hairs will span a target of 15 inches, the space between the primary horizontal cross-hair and the secondary horizontal cross-hair labeled "5" would cover a 90 inch target, and so on. As can be seen, there is a linear relationship between the inches of angle scale and the range to the target in yards.

Figure 6:
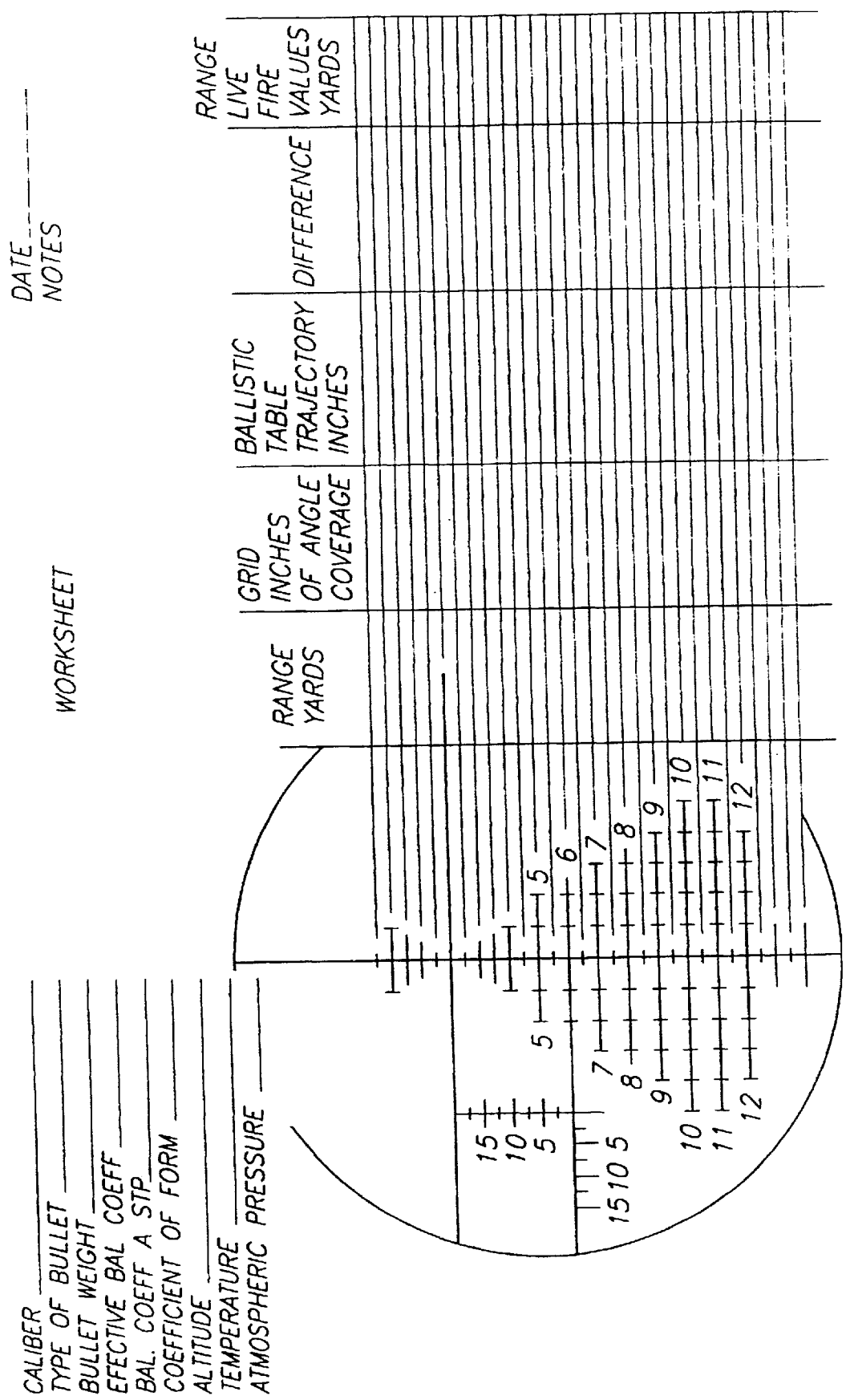
FIG. 6 is an example of a worksheet which can be used to calibrate the markings on a reticle of the present invention.

Using a table such as that shown in FIG. 5, and a worksheet, such as that shown in FIG. 6, the shooter can "calibrate" a scope of the present invention for the particular weapon and ammunition selected. For this example, a 500 yard zero table was selected for purposes of illustration. Therefore, the shooter marks the primary horizontal cross-hair 22 on the worksheet with the number 500 (e.g., if the target were exactly 500 yards down range, the shooter would select an aiming point along the primary horizontal cross-hair 22 to hit the target). The range value of the first secondary horizontal cross-hair below the primary horizontal cross-hair can then be calculated. Estimating a value of between 600 and 700 yards, the shooter can determine the closest value by calculating the inches of angle at 600 and 700 yards (which corresponds to bullet drop)

$$\frac{2.5 \text{ inches of angle}}{100 \text{ yards}} \times 600 \text{ yards} = 15.10 \text{ inches of angle}$$

$$\frac{2.5 \text{ inches of angle}}{100 \text{ yards}} \times 700 \text{ yards} = 17.50 \text{ inches of angle}$$

These calculated values are matched with the values shown in the selected Ingalls table (in this example, the 500 yard zero table shown in FIG. 5). The 600 yard range on the table shows a trajectory of 18.4 inches. The 700 yard range on the table shows a trajectory of −44.6 inches. Since the calculated bullet drop at the first secondary horizontal marker is 15.1 inches, and this most closely correlates with the trajectory shown in the Ingalls table for 600 yards (−18.4 inches), the first secondary horizontal cross-hair below the primary horizontal cross-hair is marked on the worksheet as 600 yards. Although the actual bullet impact should be 3.3 inches below the dead center of the 12 inch diameter bulls eye (18.4−15.1=3.3), this is close enough since a hit is considered to be anything within the 12 inch bulls eye.

Figure 7:
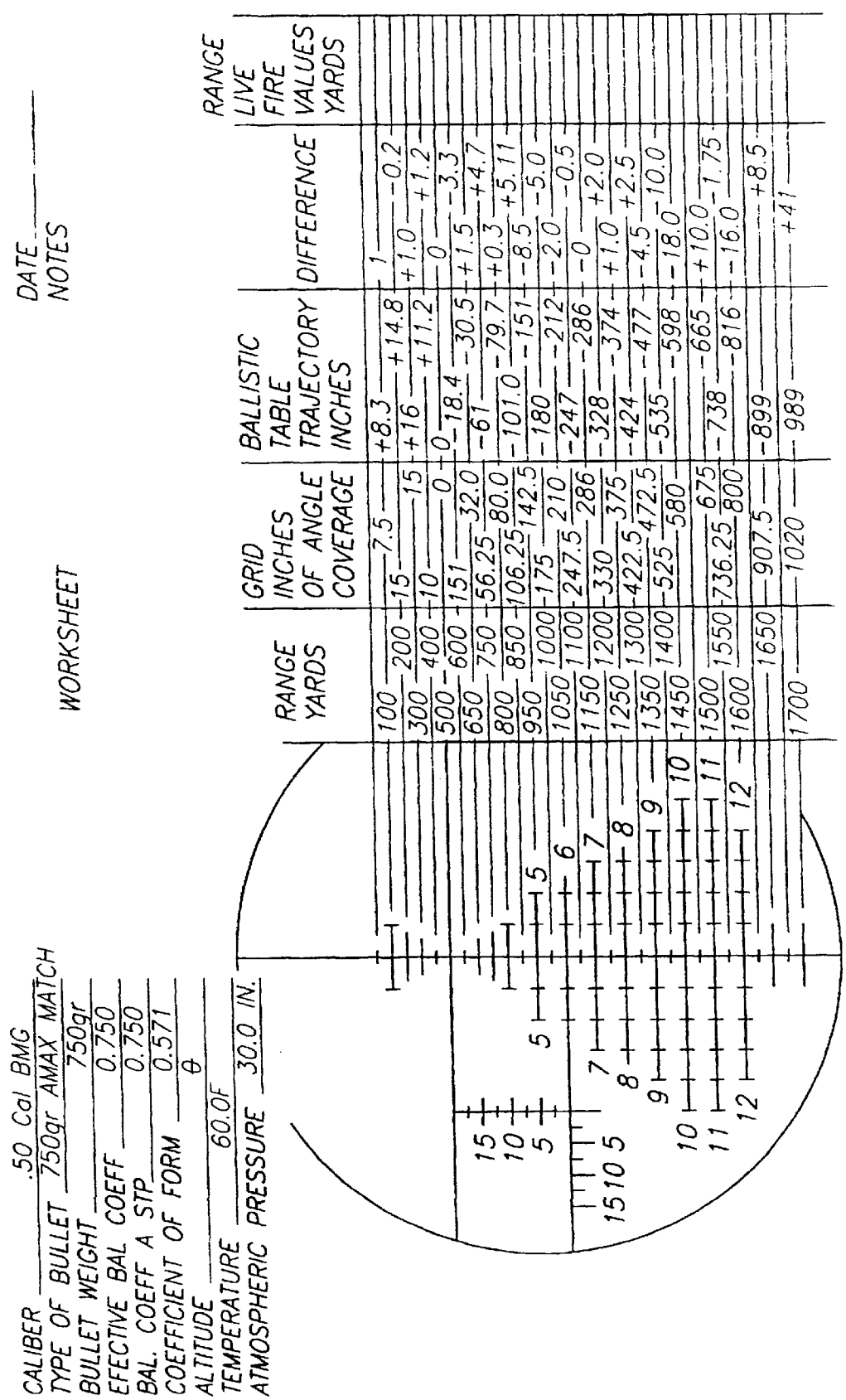
FIG. 7 is a completed worksheet based upon the table shown in FIG. 5.

The shooter can then repeat this process to calibrate the reticle for every secondary horizontal cross-hair below the primary horizontal cross-hair. The results in this example, shown in FIG. 7, can be used to shoot at any target within a range up to 1700 yards. Longer ranges can also be calibrated using a zero table for a longer range (e.g., anything from a 600 yard zero table to a 2500 yard zero table). Once the worksheet is completed, it can be cut out and taped to the butt of the shooter's rifle or carried by the shooter for easy reference.

Alternatively, the shooter can locate the secondary horizontal cross-hair to use for an aiming point for a specific range. For example, using the same 500 yard zero chart found in FIG. 5, if the shooter wishes to hit a target at 1100 yards, he estimates two or three secondary horizontal cross-hairs which should bracket the correct secondary horizontal cross-hair to use as an aiming point. The shooter guesses the correct cross-hair is between the cross-hair identified as 6 and the cross-hair identified as 8. He then performs the same calculation:

Cross-hair #6: $\dfrac{20 \text{ inches of angle}}{100 \text{ yards}} \times 1100 \text{ yards} = \dfrac{220 \text{ inches of angle}}{}$ Cross-hair #7: $\dfrac{25 \text{ inches of angle}}{100 \text{ yards}} \times 1100 \text{ yards} = \dfrac{275 \text{ inches of angle}}{}$ Cross-hair #8: $\dfrac{30 \text{ inches of angle}}{100 \text{ yards}} \times 1100 \text{ yards} = \dfrac{330 \text{ inches of angle}}{}$ Looking at the 500 yard table, the bullet drop at 1100 yards is 247 inches. This looks fairly close to mid-way between. To double check this estimate, the shooter can run the calculation for the unlabeled secondary horizontal cross-hair between cross-hair 6 and cross-hair 7, which is located 22.5 inches of angle below the primary horizontal cross-hair:

$$\dfrac{22.5 \text{ inches of angle}}{100 \text{ yards}} \times 1100 \text{ yards} = 247.5 \text{ inches of angle}$$

This value most closely approximates the trajectory according to the 500 yard zero Ingalls table used for this example, and, if used should correspond to a point exactly 0.5 inches off dead center.

Once the scope has been calibrated for the weapon and ammunition specified, the shooter can test the calculated values against actual performance at a range. The values generated using computer projections, ballistic tables and calculations are only a guide; however, they should be quite close to actual performance. It is preferred that the final range value assigned to each secondary horizontal cross-hair should be based on an actual line firing test of the selected weapon and ammunition at various ranges. A minimum of three shots should be used for the final confirmation of the estimated values.

Automatic Calculation of Targeting Grid for Cross-Hairs

It is easier, and therefore more preferable, however, to use a new ballistics program called the, "TRAG1S program" which is available from Horus Vision, LLC, 659 Huntington Ave, San Bruno, Calif. 94066, to directly and automatically calculate accurate values for the cross-hairs of the reticle of the present invention using a personal computer, monitor and printer, the combination of which I will hereinafter refer to as a "system." This program is a modified version of the Ballistics program written by William C. Davis of Tioga Engineering which has been adapted to directly calculate values for a reticle of the present invention, in addition to values for conventional reticles, and to run either on a windows-based PC or on a personal digital assistant ("PDA") type device. The program is preferably loaded into internal memory accessible by the device, such as, for example, by installing it on a hard drive. While less preferably, it is also possible to provide the program on a floppy disc, CD, DVD, ROM chip, or other similar device which is accessible by the controller). For PDA type devices, the program can be installed on internal memory, or stored on a plug-in device (such as an insertable ROM chip or memory stick).

Figure 16A:
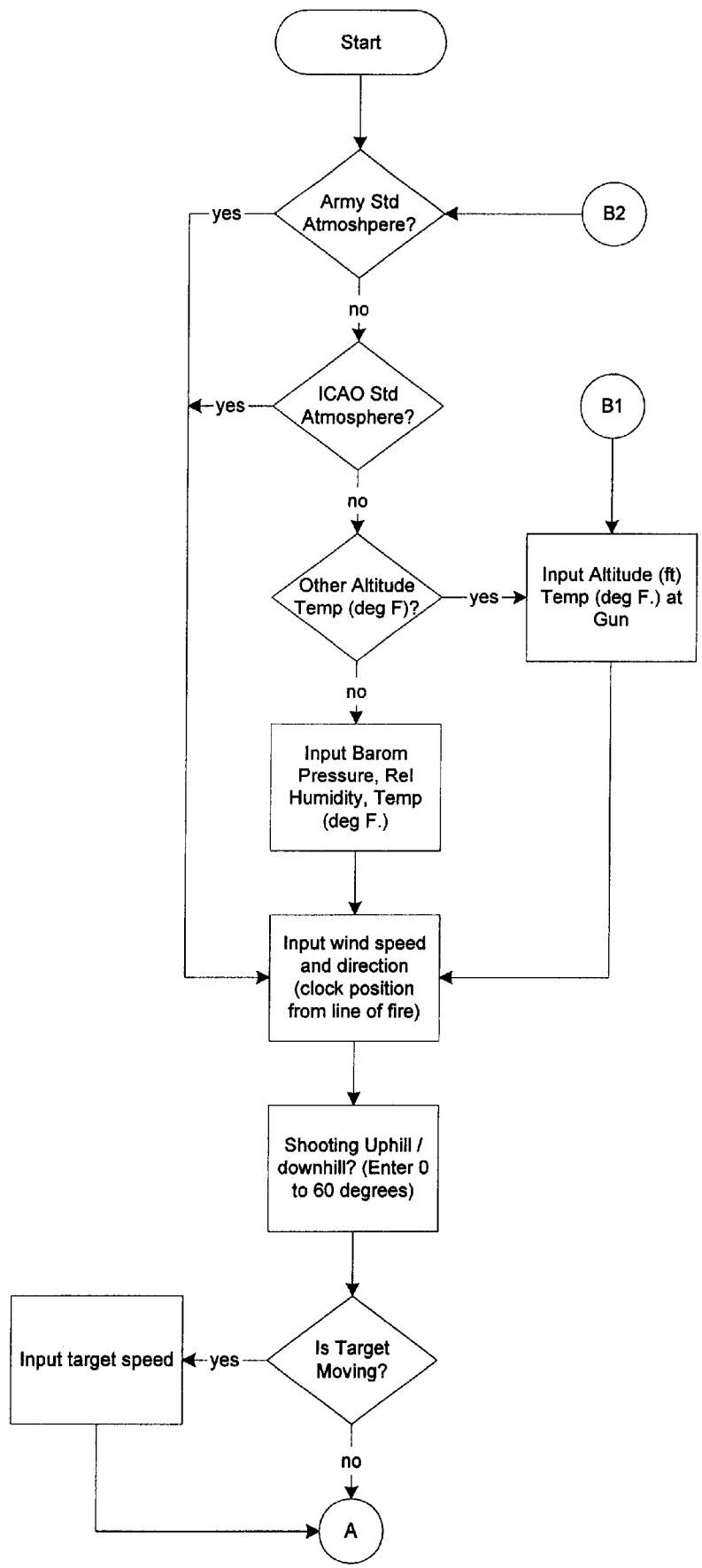
FIG. 16a is a flow chart illustrating the data inputs relating to external conditions at the range required by the TRAG1S5 Ballistics Computer Program.
Figure 16B:
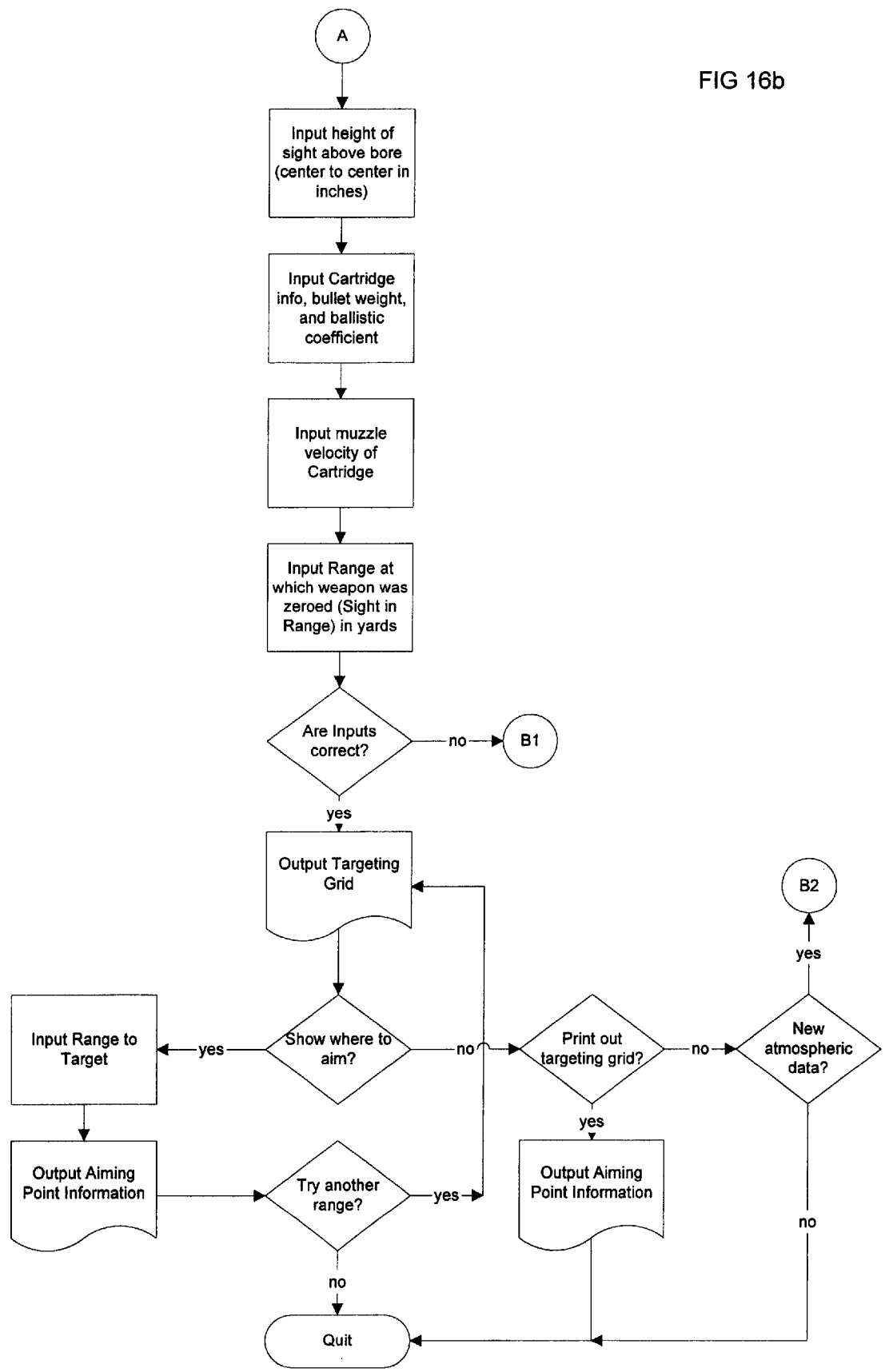
FIG. 16b is a flow chart illustrating the data inputs relating to weapon and ammunition required by, and outputs produced by, TRAG1S5 Ballistics Computer Program.

The process begins, as explained in detail above, by zeroing the weapon. Once the weapon has been zeroed at a known range, the program is started. FIGS. 16a and 16b illustrates the data which is input, and the targeting information which is output and which enables the calibration of the the cross-hairs of a reticle of the present invention.

For the PC-based version of this Program, as shown in FIG. 16a, information regarding external factors are requested by the system and input by the user in response to each query as it appears on the monitor screen. Data can be entered into the system using any conventional input device linked to the system, such as a keyboard, mouse, and/or touchscreen and the like. It may also be possible to input data using a voice recognition system (microphone and appropriate software for converting the spoken words to data).

The first screen requests the user to select from four possibilities for atmospheric conditions: (1) "Army Standard Metro" sea-level atmosphere (temperature=59 degrees Fahrenheit, atmospheric pressure=29.53 inches of mercury, and relative humidity=78 percent); (2) "ICAO Standard" sea-level atmosphere (temperature=59 degrees Fahrenheit, atmospheric pressure=29.92 inches of mercury and relative humidity=zero); (3) actual altitude and temperature at the shooting site (if known); or (4) actual barometric pressure, relative humidity, and temperature at the shooting site (if known). Naturally, the program could be modified to request additional information, and to expand or contract the options. The most accurate information which can be provided by the shooter is the actual barometric pressure, relative humidity and temperature at the shooting site. Altitude and temperature at the shooting site are used by the program to estimate a barometric pressure and relative humidity, and may be more accurate than either of the two standard conditions choices.

The system next requests the user to input information regarding windspeed in miles per hour. Once this information has been input, the system requests the user to input wind direction (the clock position from the line of fire). Thus, if the wind is perpendicular to the line of fire and traveling from the shooter's right to the shooter's left, the wind direction would be "3" for the 3 o'clock position. If traveling in the opposite direction, the wind direction would be "9" for the 9 o'clock position. Wind speed and direction is used by the system to calculate the appropriate adjustment to the aiming point at any effective range (that is, the number of vertical cross-hairs from the primary vertical cross-hair the aiming point will be offset into to wind so that the bullet will hit the target when it travels downrange).

The next query asks the user to input any uphill/downhill slope (percentage from 0 to 60 degrees). This information is used to adjust the downrange aiming point based on the bullet's flight through space from the point of firing to target. As can be appreciated, the distance to a target over sloped ground is somewhat longer than the horizontal distance to a target the same distance from the shooter over flat ground. The program treats this problem using simple trigonometry (with the distance to the uphill/downhill target being treated as the hypoteneuse of a triangle and calculated using the distance to target as the base of the triangle and the slope of the ground as the angle between the base and the hypoteneuse), and ignores the negligible effect of gravity, so it makes no difference whether the ground in front of the shooter slopes up or down.

Finally, the system queries the user to indicate whether the target is moving or not. If the target is moving, the system asks the user to estimate the speed of the target. This information is used to calculate a lead adjustment in the aiming point so that the user can hold the correct aiming point on the moving target so as to discharge the bullet towards the place where the target will be when the bullet arrives (assuming the target does not unexpectedly change direction).

As shown in FIG. 16b, once the external factors have all been input, the system queries the user to input "internal" information regarding the weapon and ammunition being used. The first query requests the user to input the height of the sight above the bore of the gun. This is the distance in inches between the optical center of the riflescope and the center of the gun barrel.

The next query requests textual information for identifying the type of cartridge to be used. This information is not used in the calculations, but is printed out on the targeting grid so that the targeting grid for one cartridge can be distinguished from subsequent targeting grids produced for other types of cartridges.

The next query requests the weight of the bullet in grains. This information is typically found on the box the ammunition or bullets came in.

The next query requests the ballistic coefficient of the bullets. Again, this information is typically found on the box the ammunition or bullets came in.

The next query requests the muzzle velocity of the cartridge. Muzzle velocity is a function of the bullet's characteristics, the kind and amount of powder used in the cartridge case, and the primer. Again, this information is typically found on the box the ammunition came in or in the manufacturer's catalog, or for custom cartridges can be determined experimentally using conventional equipment for measuring muzzle velocity.

The final query requests the user to input the range at which the weapon was zeroed (the range at which the weapon was "sighted").

After this information is input, all of the information is displayed, and the user is asked if the inputs are correct. If the user responds "no", the user is permitted to edit and correct the inputs.

Once the inputs are correct (e.g., the user responds "yes" to the query "are inputs correct?"), the program creates a targeting grid which callibrates the horizontal cross-hairs of a reticle of the present invention for range, and provides the necessary off-set information for cross-wind and/or target movement. This grid can be displayed conventionally (on a computer display screen), or more desirably, can be printed out and taken by the shooter to the range.

Figure 17A:
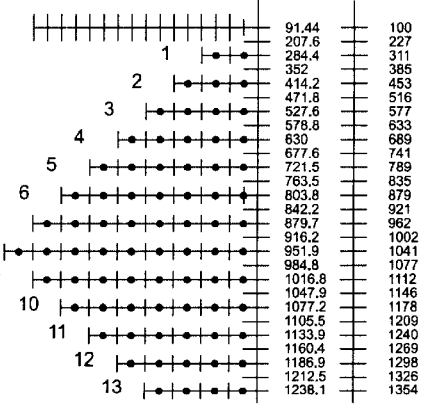
FIG. 17a is a targeting grid generated by a personal computer running the TRAG1S5 Ballistics Program for callibrating the range of the secondary horizontal cross-hairs of a reticle of the present invention for stationary targets on a flat range and for calculating cross-wind horizontal offset information for each secondary horizontal cross-hair.

For example, the Targeting Grid shown in FIG. 17a was produced in response to the following inputs:
Altitude=1500 (ft above sea level)
Temperature=82 (degrees F)
Windspeed=10 (mph)
Wind Direction=3 (o'clock)
Slope=0 degrees (flat terrain)
Target Moving=no
Height of sight above bore=1.9 (inches, center-to-center)
Cartridge information=.300 Win Mag Federal Gold Medal
Bullet Weight=190 (grains)
Ballistic Coefficient=0.533
Muzzle velocity=2960 (feet per second)
Sight-in range=100 (yards)

As can be seen from FIG. 17a, the range for each horizontal cross-hair from the primary horizontal cross-hair is identified, as is the amount of horizontal adjustment to be made at each horizontal cross-hair to compensate for cross-wind at that range, to the left or the right (as appropriate) from the primary vertical cross-hair.

Figure 17B:
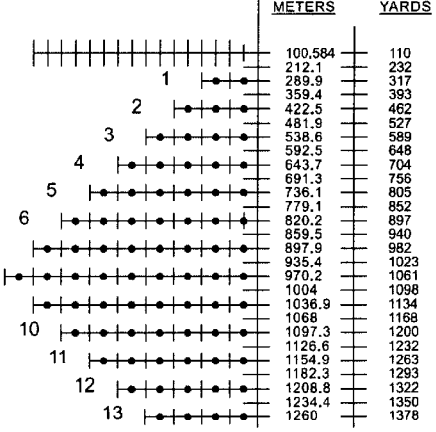
FIG. 17b is a targeting grid generated by a personal computer running the TRAG1S5 Ballistics Program for calibrating the range of the secondary horizontal cross-hairs for a reticle of the present invention for stationary targets on a sloped range and for calculating cross-wind horizontal offset information for each secondary horizontal cross-hair.

A more complex situation is illustrated by FIG. 17b, which is the same example as shown in FIG. 17a except that now information regarding the slope of the area over which the bullet will travel has been input (15 degrees). As can be seen, the program has adjusted the range values for each horizontal cross-hair to compensate for the bullet's travel over sloped ground (the hypoteneuse of a triangle) as opposed to flat ground (the base of a triangle). Thus, horizontal cross-hair 5 of FIG. 17a has been assigned a range of 789 yards for flat ground, while horizontal cross-hair 5 of FIG. 17b (15 degree slope) has been assigned a range of 805 yards.

Figure 17C:
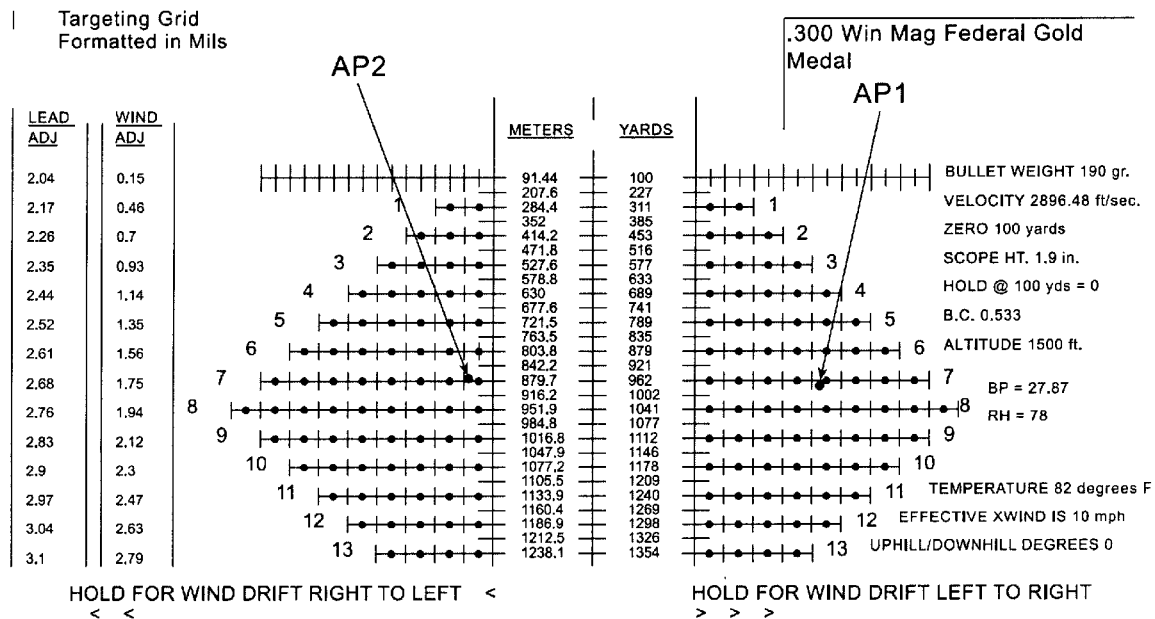
FIG. 17c is a targeting grid generated by a personal computer running the TRAG1S5 Ballistics Program for calibrating the range of the secondary horizontal cross-hairs for a reticle of the present invention on a flat range and for calculating lead information for a moving target and cross-wind offset information for each secondary horizontal cross-hair.

FIG. 17c illustrates an example in which all inputs are the same as shown for FIG. 17a, except information regarding a moving target has been input. In this example, the target is moving an estimated 4 miles per hour. The lead adjustment has been calculated by the program for each horizontal cross-hair, and is shown in tabular form in the far left column of FIG. 17c. The final adjustment is determined by the user by adding the wind adjustment to the lead adjustment if the wind and target are moving in opposite directions (i.e., the target is moving into the wind), or by subtracting the wind from the lead adjustment if the wind and target are moving in the same direction (i.e., target moving with the wind). Thus, for example, if the target is spotted at a range of 962 yards, and the wind is traveling from right to left and the target is traveling from left to right, the wind adjustment is added to the lead adjustment, to obtain the aiming point identified as "AP1". If the wind and target are moving together (i.e., wind and target both moving from right to left), the wind adjustment is subtracted from to the lead adjustment to obtain the aiming point identified as "AP2".

For very long range shooting (e.g., from 1000 to 3000 yards), it may be desirable to modify the targeting program to compensate for Coriolis Effect. Coriolis effect is caused by the rotation of the earth. Coriolis effect is an inertial force described by the 19th-century French engineer-mathematician Gustave-Gaspard Coriolis in 1835. Coriolis showed that, if the ordinary Newtonian laws of motion of bodies are to be used in a rotating frame of reference, an inertial force—acting to the right of the direction of body motion for counterclockwise rotation of the reference frame or to the left for clockwise rotation—must be included in the equations of motion. The effect of the Coriolis force is an apparent deflection of the path of an object that moves within a rotating coordinate system. The object does not actually deviate from its path, but it appears to do so because of the motion of the coordinate system. While the effect of the earth's movement while a bullet is in flight is negligible for short and medium range shots, for longer range shots, the Coriolis effect may cause the shooter to miss a shot by inches at longer ranges. To compensate for Coriolis effect, the targeting program can be modified to additionally pose queries regarding the Hemisphere in which the shooter is located (northern or southern), the latitude of the gun, and the direction of fire (in degrees, clockwise from true north). The latitude of the gun can be easily determined manually using a topographic map of the area in which the shooter is located, or automatically using a Global Positioning System (GPS) device. With these inputs, and the range to target, the offset required by the Coriolis effect can be factored in when determining the aiming point for hitting the target for either PC or PDA based targeting programs.

Figure 19A:
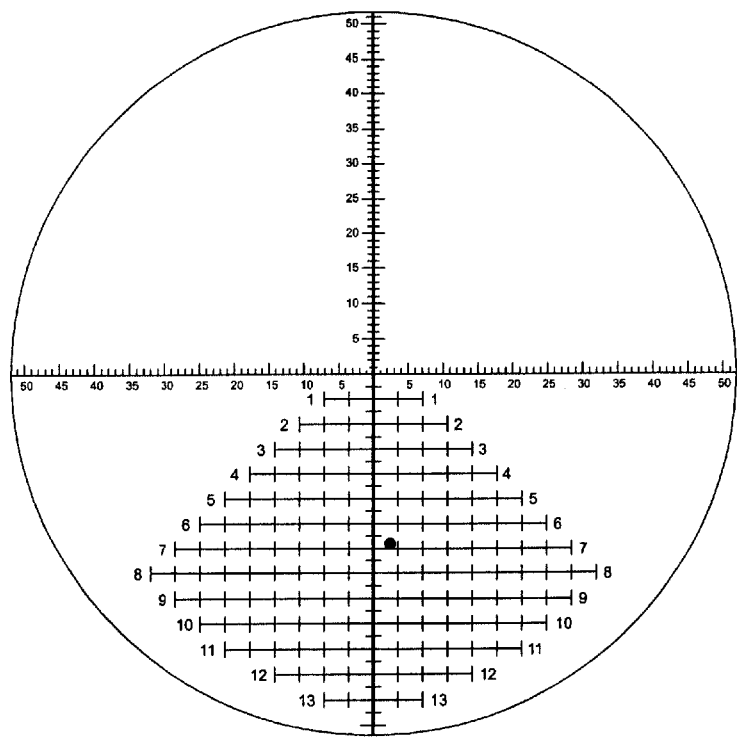
Figure 19B:
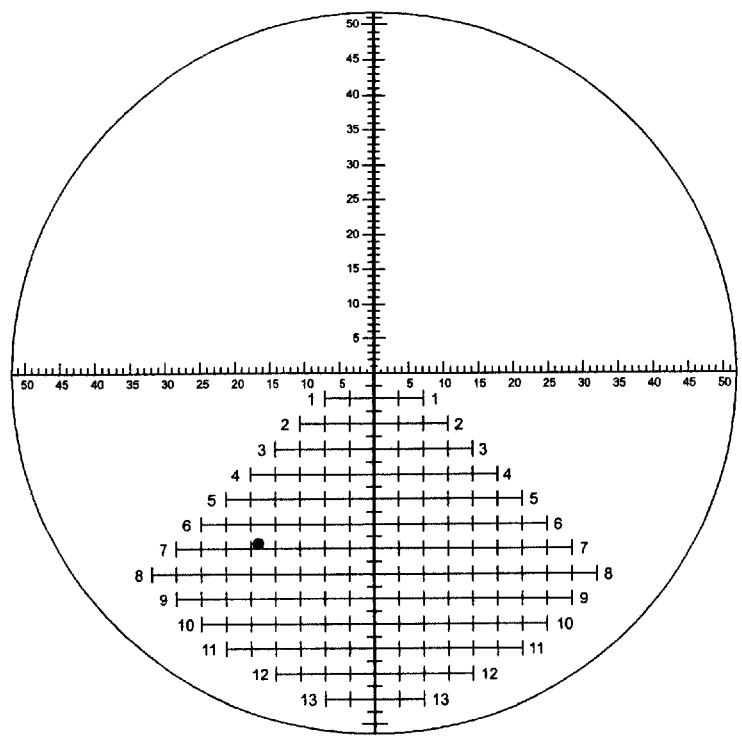
Figure 19C:
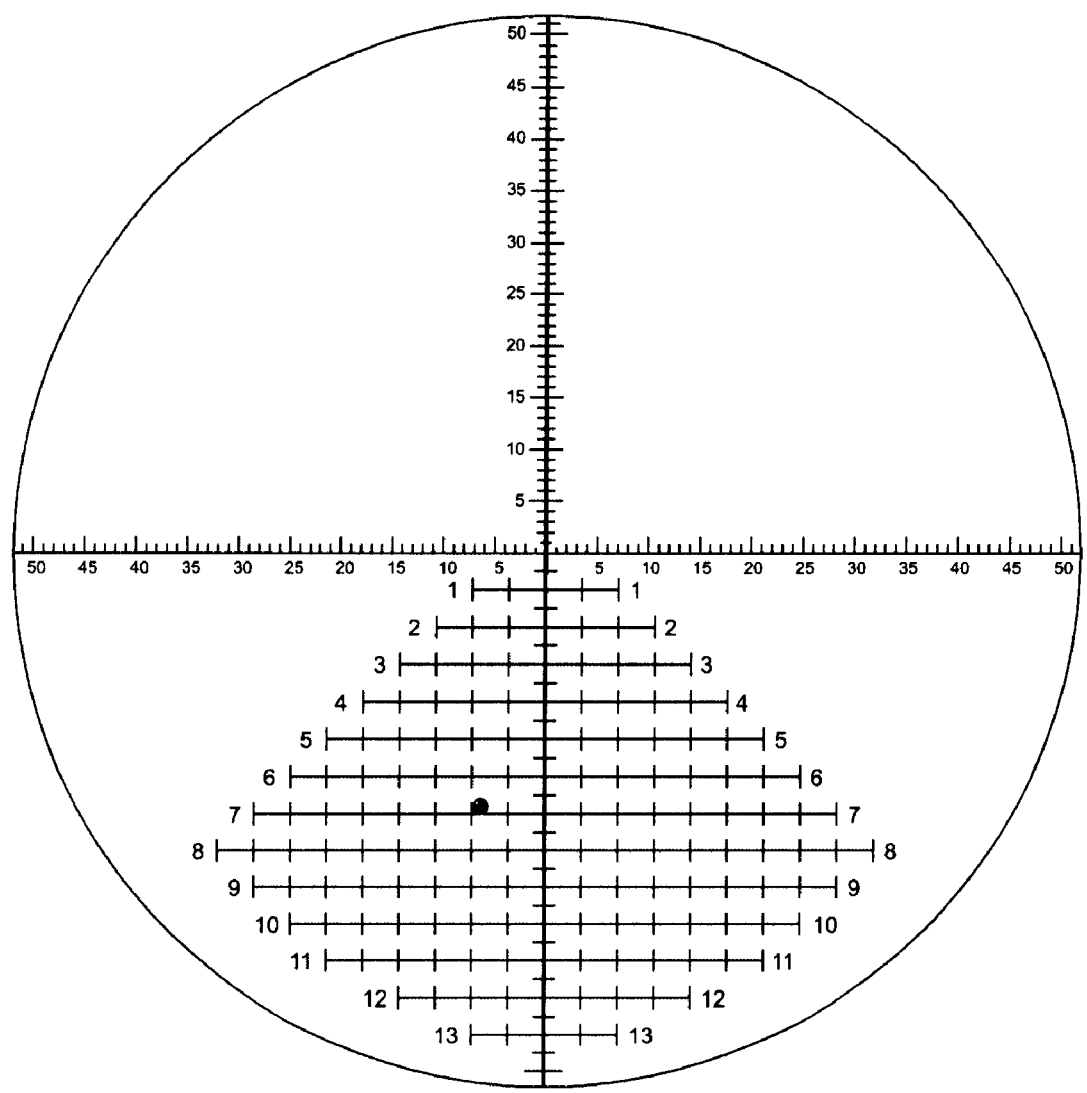

As noted above, once the targeting grid has been created and displayed by the system, the user is again presented with options: (1) print out the targeting grid; (2) enter new atmospheric data; (3) identify a specific aiming point on the reticle for a target at a specific range; or (4) quit. With the present software, if the user decides to print out the targeting grid, the only remaining option is to quit. If it is desired to create additional targeting grids, the program can be started again. However, it would be easy to modify the software to allow the user to go back after printing out a targeting grid and exercise any of the other options. If the user decides to enter new atmospheric data based upon a new shooting position, the data regarding the weapon and ammunition is retained in the calculations. If the option to identify the aiming point is selected, the user is queried to input the range to a specific target. Once the range is input, a picture of the reticle is displayed by the computer with the suggested aiming point marked (see, e.g., FIGS. 19a–19c). The user can then select the option to find another aiming point (for a new target at a different range) or can quit the program. It would also be possible (although less desirable) for the output to be in the form of digital words played through a speaker.

As can be seen from FIGS. 17a, 17b and 17c, the targeting grid software has greatly simplified the process of calibrating a scope containing a reticle of the present invention for specific conditions at the range and for the firearm. The primary disadvantage of this system is that personal computers are not very portable. Many shooters do not wish to lug even small laptops around while shooting, where they can be subjected to harsh conditions of weather, accidents, and dust. Accordingly, the data compiled some time before the user actually goes to the range to shoot, may change by the time the shooter arrives at the range. If external conditions change during the interim, the predicted ranges correlated to the horizontal cross-hairs may not be as accurate as they would be if external conditions were measured and input at the range just prior to shooting.

Accordingly, we have modified the TRAG1S5 ballistics software to adapt it for use with a Personal Digital Assistant (PDA) hand-held computing device, such as, for example, the Palm Pilot (Palm Pilot is a registered trademark of Palm, Inc.). These devices are particularly useful because, unlike Windows PC, the device can be turned off while the program is active, and when the device is turned back on, the user is returned to the screen that was active at the time the device was turned off. This enables the user to make inputs and turn the device off while moving to a new location. In addition, PDAs are presently available which incorporate cellular modem technology which enable remote access to email and the internet, and infrared receiving/transmitting capability to enable the remote exchange of data between similar devices or between the PDA and another device capable of receiving or sending data to the PDA via an IR beam. Such devices may enable the user to access accurate meterological and other data from the internet or from other devices remotely (e.g., from the range, without the need for cabling). Accordingly, the term "PDA" or "Personal Digital Assistant" as used herein means any small, hand-held computing device which can be programmed to receive the necessary data inputs and calculate the targeting information described herein, regardless of whether, for example, such devices are viewed commercially as cellular telephones with computing capability or as hand-held computers with cellular capability..

While typically powered by a rechargeable battery, it is likely that PDAs will be developed which utilize other sources for generating the necessary power for the device, including solar chips. The PDA targeting program has also been adapted for use in conjunction with a reticle of the present invention as well as for use with conventional reticle/scope combinations which are conventionally adjusted for a specific shot by turning elevation and windage knobs a specified number of clicks.

As before, it is necessary to zero the weapon at a predetermined range and to adjust the scope so that the primary cross-hair is the aiming point for the "sight-in" range. Once this has been done, and the user has verified that the weapon is producing satisfactory group of shots at selected sight-in range, the PDA targeting program can be activated.

The targeting program can be selected by tapping the targeting program icon on the "home" screen. The user first chooses the type of scope/measurement system being used (conventional scopes with range/windage adjustments or a scope fitted with a reticle of the present invention). If a conventional scope is selected, the output will identify the number of "clicks" needed to adjust the elevation and windage knobs on the scope to properly position the crosshair of the conventional scope to hit the target. If a scope using a reticle of the present invention is selected, the output will identify the position of the aiming point on the reticle. At present, due to the small size of the display screen and the limited amount of memory available with PDA type devices, the aiming information provided is numerical. However, as such devices are provided with more memory, it should be possible to provide as aiming information a graphical depiction of the reticle being used with the exact aiming point identified, as is presently possible with the TRAG1S5 version for windows-based PCs.

Figure 18A:
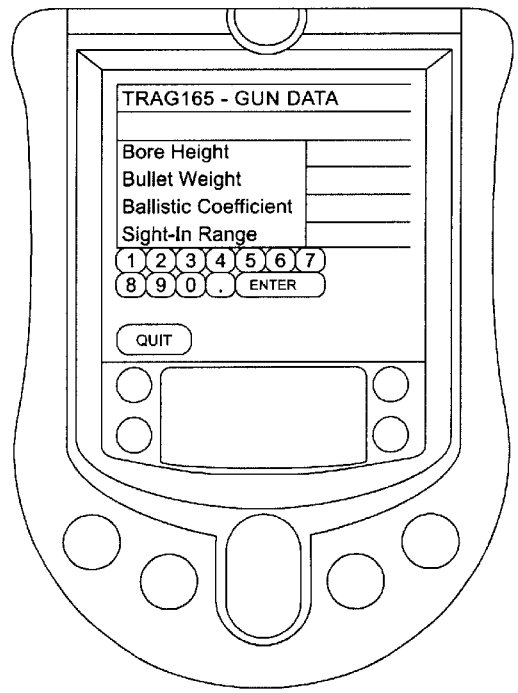
FIGS. 18a–18e illustrate PDA data input screens for using the TRAG1S5 PDA targeting program.

Once the type of scope has been identified, the PDA targeting program asks for four parameters as shown in FIG. 18a: (1) bore height (the distance between the rifle barrel and the scope, center-to-center in inches); (2) bullet weight (in grains); (3) ballistic coefficient; and (4) sight-in range (the range at which the firearm was zeroed, in yards). The program positions the blinking cursor in the field where the first number is to be entered. The numbers, a period, an "enter" key and a "quit" key are displayed below the four queries. The bore height is entered by tapping the appropriate number and tapping the "enter" key on the display. The blinking cursor then appears in the second field (or the user taps the second field to position the cursor there), and the number corresponding to the bullet weight is tapped and the "enter" kay tapped. The blinking cursor then appears in the third field (or the user taps the third field to position the cursor there), and the number corresponding to the ballistic coefficient is tapped and the "enter" key is tapped. Finally, the blinking cursor appears in the fourth field (or the user taps the fourth field to position the cursor there), and the number corresponding to the sight-in range is tapped and the "enter" key is tapped. All four parameters are displayed and an "OK" button is displayed. The user can then review the four parameters, and if they are correct, the "OK" button is tapped. If the parameters are not correct, the "QUIT" button is tapped, and user can start over by reentering the correct parameters.

Figure 18B:
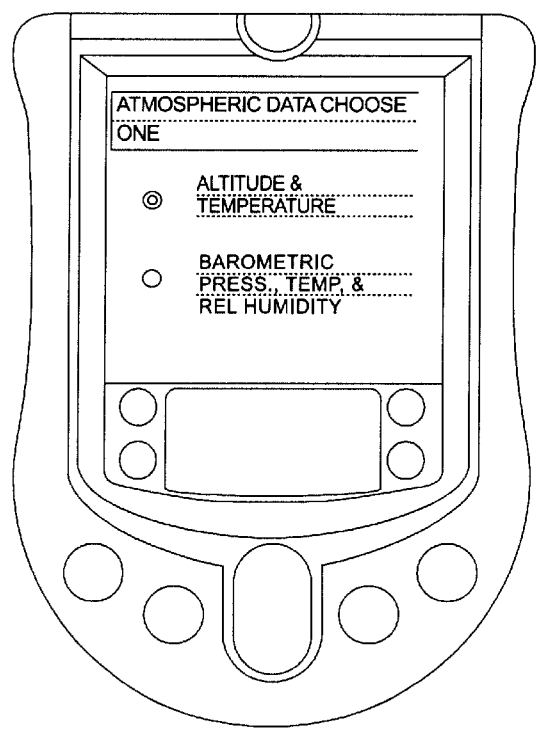
Figure 18C:
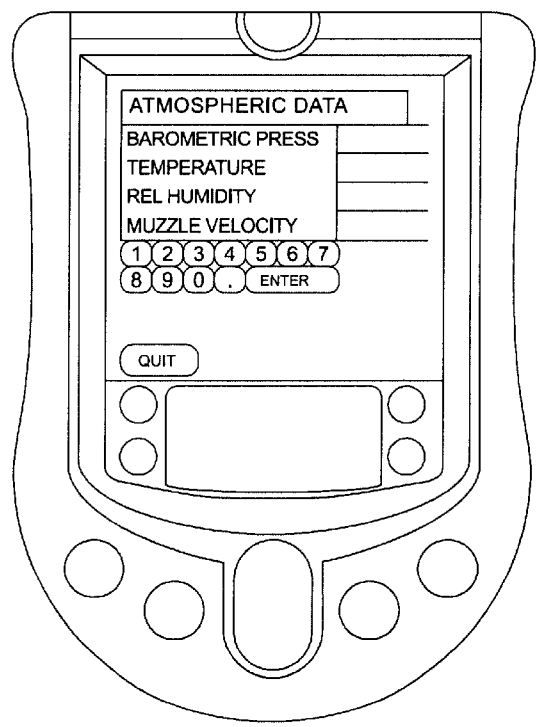

When the "OK" button is tapped, a second screen, shown in FIG. 18b is displayed by the PDA which allows the user to select the kind of atmospheric data to be input. We prefer two choices: (1) altitude and temperature or (2) barometric pressure, temperature and relative humidity. As described in more detail above, the second option produces the most accurate result. While it is clearly possible to provide other choices, such as the standard conditions offered in the PC-based TRAG1S5 program described above, the small size of the PDA screen makes it desirable to keep each screen as compact as possible, consistent with obtaining reasonably accurate results. When the appropriate selection is made, another screen is displayed which allows the user to input the selected atmospheric data, as well as the muzzle velocity of the ammunition to be used. If the user chooses "altitude and temperature," the altitude is entered in feet above sea level, and temperature is entered in degrees Fahrenheit. If the user chooses "barometric pressure, temperature, and relative humidity," the screen shown in FIG. 18c appears and barometric pressure is preferably input as inches of mercury, temperature is preferably input in degrees Fahrenheit, and relative humidity is preferably input as a percentage.

Muzzle velocity found on the cartridge box can be adjusted, if desired, based on temperature to produce a slightly more accurate result. Since a bullet typically travels faster than the speed of sound, it creates a shock wave which induces drag on the bullet. This induced drag is lower at high temperatures, and higher at low temperatures. Accordingly, if it feels very cold to the shooter at the range, the published muzzle velocity can be reduced by 50 fps and if it feels very hot to the shooter at the range, the published muzzle velocity can be increased by 50 fps, before entering the muzzle velocity into the PDA. Again, the atmospheric inputs are displayed, and the user clicks the "OK" button if all are correct and the user is ready to continue.

Figure 18D:
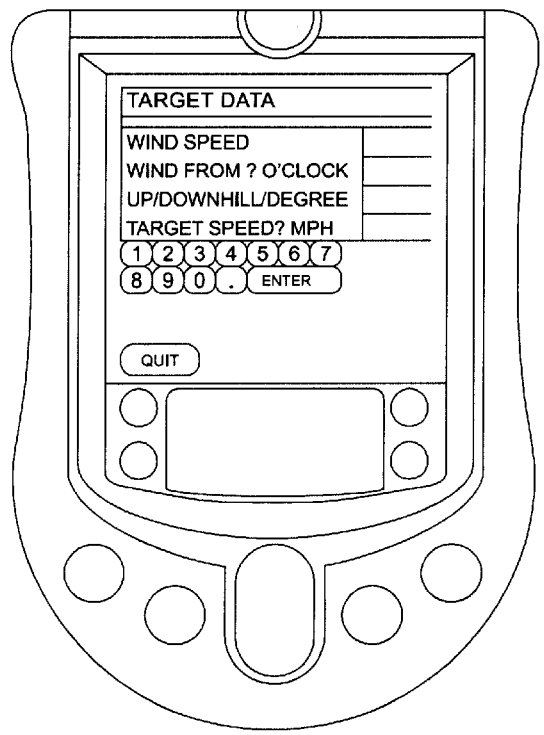

As shown in FIG. 18d, the user can then input information on windspeed (in miles per hour at the muzzle), the wind direction (clock position from line of firing), slope of the ground over which the bullet will travel (in degrees), and the target speed (in miles per hour). Once the data is in, an "OK" button appears which the user can tap once the data is checked and verified for correctness.

Figure 18E:
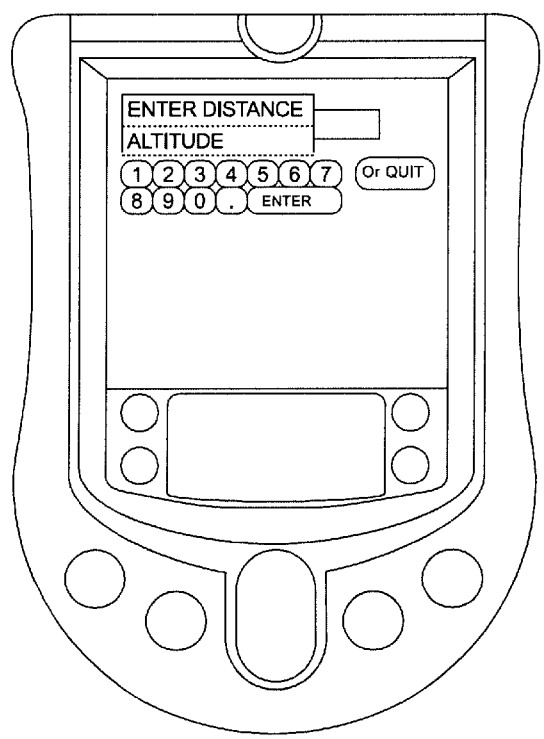
Figure 18F:
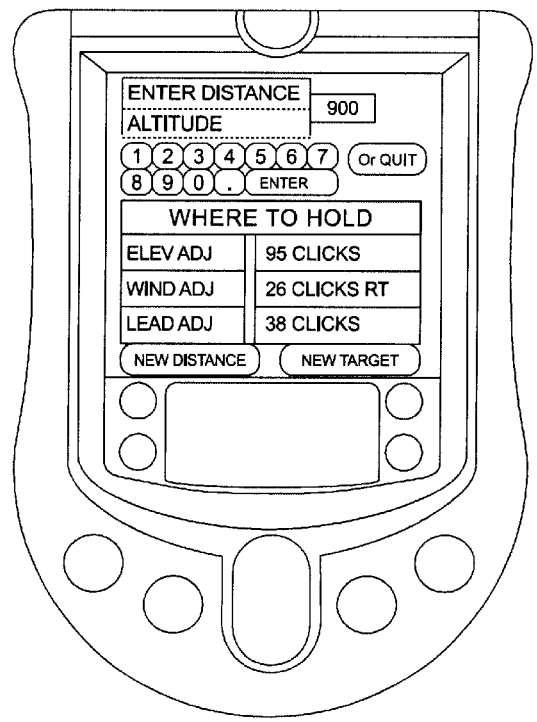
FIGS. 18f–18g illustrate PDA data output screens produced by the TRAG1S5 PDA targeting program; and, FIGS. 19a–c illustrate changes in the aiming point produced by different conditions of target speed and direction relative to wind speed and direction.
Figure 18G:
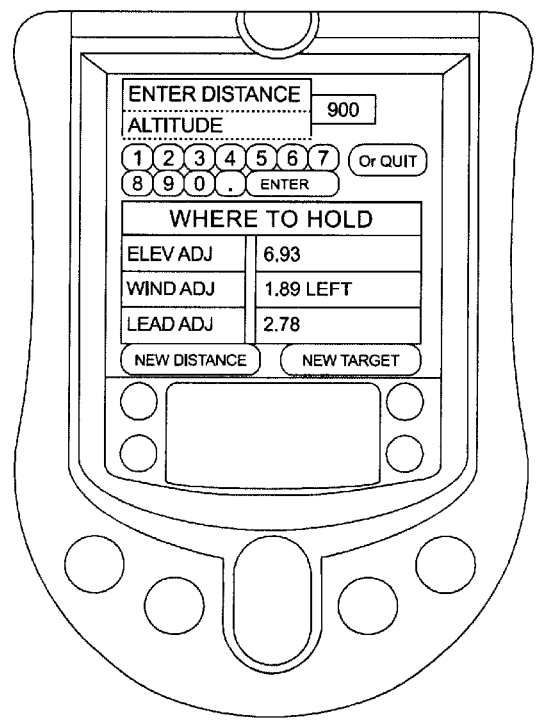

As shown in FIG. 18e, the user is now ready to enter the range to any target. At this point, the user can turn off the PDA until a target is acquired. Once the target is acquired, the range is determined using the rangefinder on the reticle of the scope or using any other desired method. The PDA is turned on, and the screen shown in FIG. 18e appears. The user simply taps in the in the distance to the target and taps "enter". As shown in FIG. 18f, if a conventional scope was initially selected, the PDA displays the number of clicks the elevation and windage knobs on the scope needed to turned so that the intersection between the vertical and horizontal cross-hairs can be used as the aiming point to hit the target. As shown in FIG. 18g, if a scope employing a reticle of the present invention was initially selected, the exact position of the aiming point for this target on the reticle is identified: horizontal cross hair is 6.93 (just above the horizontal cross-hair marked "7"); windage adjustment is 1.89 secondary vertical cross-hairs to the left of the primary vertical cross-hair (cross-wind is blowing to the right) if the target is stationary. If the target is moving to the right (with the wind), the correct windage/lead adjustment would be 2.78 right— 1.89 left=0.89 right (or almost one vertical mark to the right of the primary vertical cross-hair). If the target is moving to the left (against the wind), the correct windage/lead adjustment would be 2.78 left+1.89 left=4.67 secondary vertical cross-hairs to the left of the primary vertical cross-hair. See FIG. 19a for the reticle showing the correct aiming point when the target is moving to the right, FIG. 19b for the correct aiming point when the target is moving to the left. and FIG. 19c for the correct aiming point when the target is stationary.

While the method for inputting data into a PDA is typically done by tapping a touchscreen (or connecting the PDA to a PC and inputting data using various input devices for a PC such as keyboard, mouse, touchscreen, and the like), data can be transferred into the PDA remotely (i.e., without a hard wire connection) using cellular technology or infrared beam. It should also be technologically feasible for PDAs to be equipped with microphones, speakers or earphones, and voice-recognition and voice-generation technology to enable inputs and outputs to be spoken, thus eliminating the need to tap a touch screen, leaving the user's hands free to control the firearm. Moreover, it may be possible to link the PDA to receive positioning information from the Global Positioning Satellite using a GPS device, or to receive information regarding the azimuth to target in degrees clockwise from true north, slope of the ground to the target, and range to target by data transmission by a cable link or remote means (such as IR Beam or radio transmitter) from a laser rangefinding device equipped to measure these factors.

As noted above, whether the shooter creates a targeting grid manually, or uses the PC-based TRAG1S5 program described above, or uses the PDA-based TRAG1S5 targeting program to calibrate a reticle of the present invention, the targeting information should be verified for accuracy by shooting at a range.

Once the reticle has been calibrated as described above, it can be used in the field to acquire and hit targets of all sizes at long ranges. While the preferred range for the preferred embodiment is at least 500 yards to 2500 yards (assuming the weapon/ammunition combination selected are capable of accurately hitting a target at these ranges), a scope of the present invention can be used to hit targets at shorter ranges, as well as longer ranges, limited only by the capacity of the weapon and the eyesight of the shooter.

A rangefinder, such as that shown in FIG. 2, can easily be used to accurately determine the range to a target whose size is known or can be estimated. For example, for a 36 inch bull's-eye target placed at an unknown distance from the shooter, the shooter need only align the right edge of the target with the vertical arm 32 of the rangefinder so that the horizontal arm 34 of the rangefinder appears to pass through the center of the bull's-eye target. If, for example, the left edge of the target extends to the cross-hair corresponding to 6 inches of angle, then the observed size of the target is 6 inches of angle, and the range to target is calculated to be:

$$\text{Range (yards)} = \frac{\text{target's actual size (inches)} \times 100}{\text{observed inches of angle on rangefinder}}$$

or, in this example, $$\text{Range (yards)} = \frac{36 \times 100}{6} = \frac{3600}{6} = 600 \text{ yards}$$

As a further example, suppose that the shooter observes a moose in the distance, eating vegetables from a garden near a house. From a comparison with a door in the house, the shooter estimates the size of the moose to be 6 feet at the shoulder. Upon viewing this target in the reticle, the shooter aligns the horizontal arm 34 of the rangefinder with the ground level upon which the moose is standing, and the vertical arm 32 of the rangefinder with the moose's shoulder. The shooter determines that the moose's shoulder touches the cross-hair marked 5. The range can then be calculated as follows:

Range=72/5×100=1440 yards

Once range has been determined, the shooter can then determine and select the appropriate aiming point on the calibrated reticle, without the need for taking his eye off the target and without the need of making any adjustments to the scope.

As windage problems downrange, particularly over long ranges, may not be accurately predicted, even with the help of a PDA-based targeting system such as that described above, the experienced shooter can always use the reticle of the present invention to correct after a shot is observed to drift. As noted above, the secondary vertical cross-hairs are evenly spaced every 5 inches of angle, which provides a scale for adjusting a second shot towards the target. For example, a .50 cal. bullet is fired at a target 1500 yards away. The intersection between the primary vertical cross-hair and the secondary horizontal cross-hair identified by number 11 is the selected aiming point. The bullet was observed to drift approximately two secondary vertical cross-hairs to the right of center. To correct for this drift, the shooter need only shift the aiming point to the intersection between the second vertical cross-hair to the right of the primary vertical cross-hair and the horizontal cross-hair identified by number 11, effectively moving the barrel of the weapon left the appropriate distance to compensate for windage. Likewise, if the bullet passes the target too high or too low, the shooter can use the secondary horizontal markings to adjust for range. For example, if the bullet is observed to pass two secondary horizontal markings above the selected aiming point when it passes the target, the shooter can quickly adjust by shifting his aiming point up two secondary horizontal cross-hairs, thus depressing the barrel of the firearm.

If it is not possible to visually determine bullet drift, and if the shooter does not have access to the output of either the PC-based TRAG1S5 program or the PDA-based TRAG1S5 Targeting Program, the shooter can use a table which takes into account local conditions, the weapon, and ammunition to determine the amount of deflection over a selected range. See FIG. 8 for an illustrative table. With the conditions as stated in FIG. 8, and for a wind crossing from the left of the shooter to the right, the expected deflection of the bullet at 1000 yards would be 54.1 inches to the right. The aiming point for windage can be easily calculated:

$$\frac{\text{inches of angle on horizontal cross-hair}}{100 \text{ yards}} \times 1000 \text{ yards} = 54.1 \text{ inches}$$

$$\text{inches of angle on horizontal cross-hair} = \frac{54.1 \text{ inches} \times \frac{100 \text{ yards}}{1000 \text{ yards}}}{} = 5.41$$

Thus, the shooter can manually correct for windage on a first shot by choosing the intersection between the correct secondary horizontal cross-hair for 1000 yards, and the first secondary vertical cross-hair to the right of the primary vertical cross-hair (which, as indicated above for the preferred embodiment, is spaced 5 inches of angle away from the primary vertical cross-hair).

Figure 10:
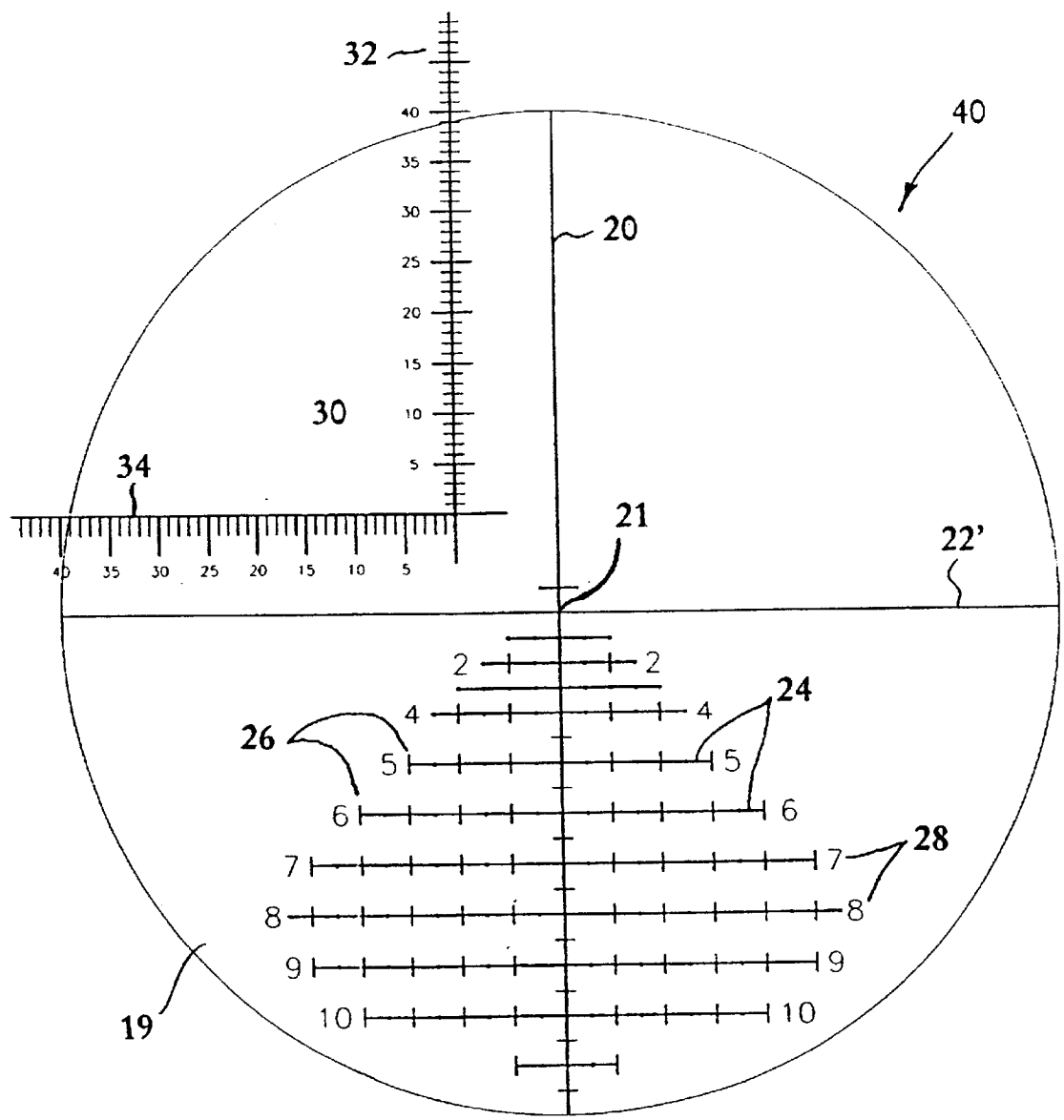
FIG. 10 is a front view of a mid-range reticle of the present invention, the spacing of the markings based upon an "inch of angle" scale.

In addition to a long-range reticle, the present invention can be adapted for use in mid-range application. For the purpose of this application, "mid-range" is defined as about 50 to about 1000 yards from the muzzle of the weapon. A mid-range reticle can be manufactured, calibrated, and used in a telescopic gunsight in the same manner as the long-range reticle described above. Although the two reticles are calibrated and used in the same fashion, slight variations can exist in their reticle markings. These slight differences stem from their different range applications. Recall that the primary horizontal cross-hair 22 in the long-range reticle was preferably located above the optical center 21 to allow for additional field of view necessary for long ranges. As shown in FIG. 10, the primary horizontal cross-hair 22' of a mid-range reticle 40 does not need to be above the optical center 21. Since the mid-range reticle is used for shorter distances, less of the lower field of view is needed. Accordingly, for a mid-range reticle, the primary horizontal cross-hair 22' is preferably be centered to intersect the primary vertical cross-hair 20 at the optical center 21. Since this provides more room in the top quadrants, the rangefinder 30 of the mid-range reticle is preferably located in the upper left quadrant rather than the lower left quadrant.

The mid-range embodiment 40 of the present invention is used in the same manner as the long-range version. The scope and reticle can be calibrated to work with almost any type of rifle. To calibrate the scope and reticle, the shooter can follow the same procedure detailed above for a long-range reticle with the reticle preferably zeroed for mid-range yardage.

Once the scope has been calibrated for the weapon and specified ammunition, the shooter can test the calculated values against actual performance at a range. It is preferred that the final range value assigned to each secondary horizontal cross-hair should be based on an actual line firing test of the selected weapon and ammunition at various ranges. At least three shots are preferably used for the final confirmation of the estimated values.

Once the reticle has been calibrated, it can be used in the field to acquire and hit targets of all sizes at mid-range distances. The rangefinder can be used to determine the range to the target as explained above with respect to the long-range reticle. Also, compensation for windage can likewise be determined as detailed above. A scope of the present invention could be used to hit targets at shorter ranges, as well as longer ranges, limited only by the capacity of the weapon and the skills of the shooter.

Figure 11:
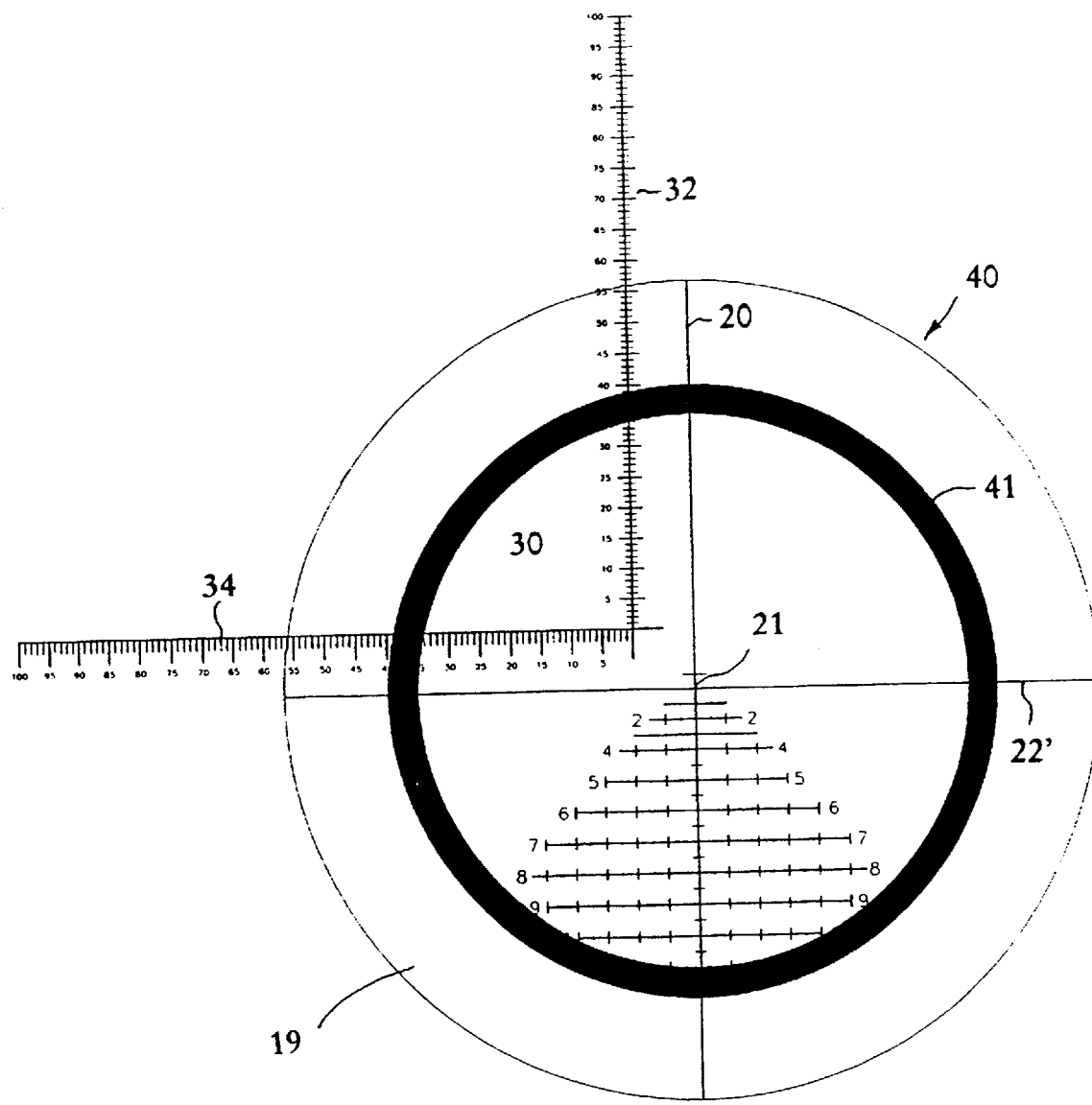
FIG. 11 is a front view of a reticle of the present invention including a circumscribing ring, the spacing of the markings based upon an "inch of angle" scale.
Figure 12:
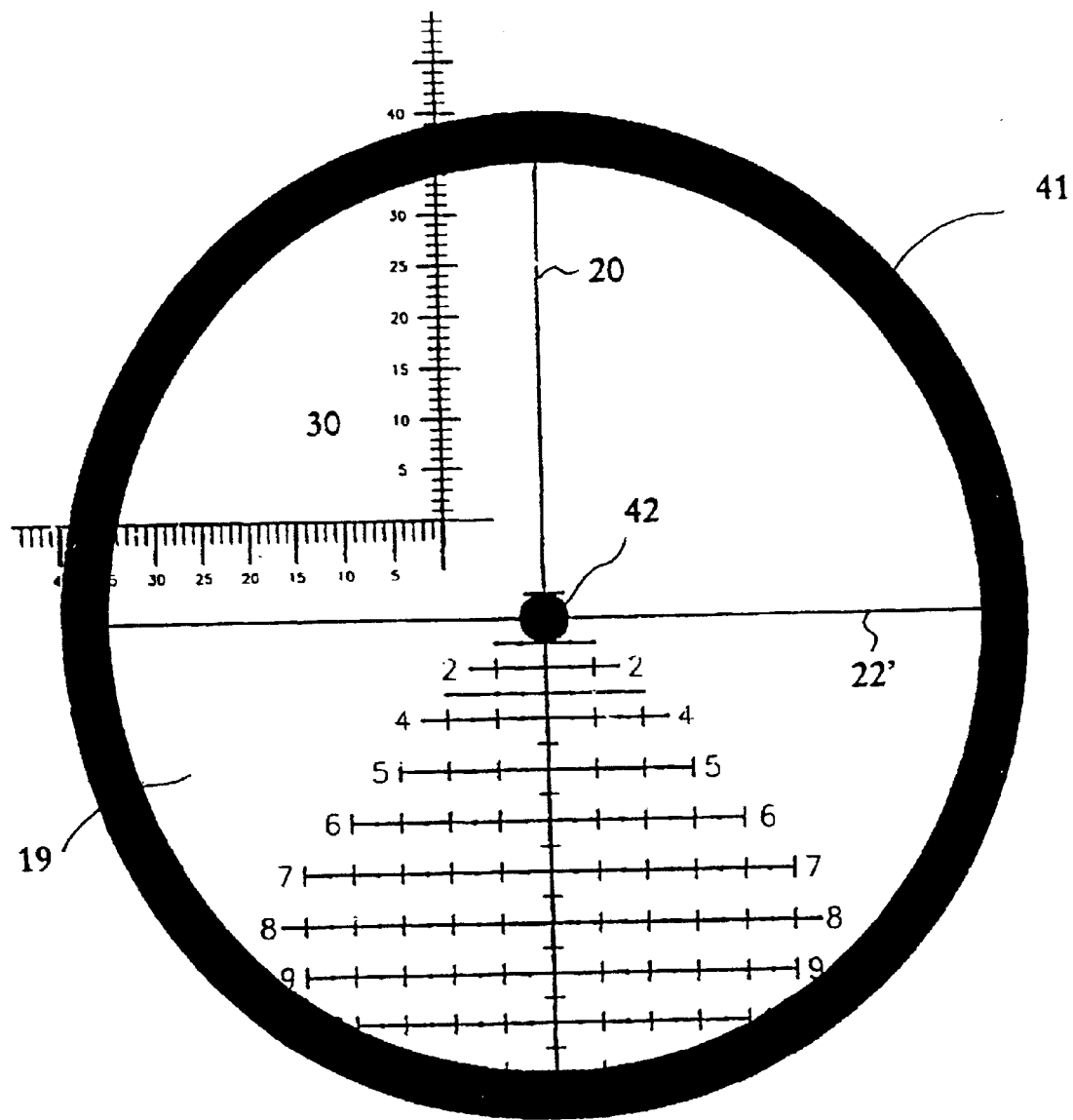
FIG. 12 is a front view of a reticle of the present invention including a circumscribing ring and an aiming dot located at the optical center, the spacing and the markings based upon an "inch of angle" scale.

More accurate results can be achieved if a shooter centers the reticle while looking through the scope. However, aligning the user's eye with the optical center of the scope is not always easy. The present invention can also be provided with a "ghost ring" 41 as depicted in FIG. 11. The ghost ring 41 is a visible ring which has as its center the optical center 21 of the scope, and which circumscribes that markings on the reticle. Ghost ring 41 aids shooters by helping them align their sight with respect to the scope and reticle. By insuring that the ghost ring 41 is centered within the field of view of the scope, the reticle will likewise be centered. As shown in FIG. 12, an aiming dot 42 can be included as an aid for rapid acquisition of moving targets, and for centering the shooter's eye in the field of view of the scope. Dot 42 is most preferably about 5 inches of angle in diameter, and is superimposed over the optical center of the reticle. Dot 42 shown is most preferably circular, but it may also be other shapes such as square, rectangular, oval, and the like. The aiming dot 42 can be a predetermined size that covers a predetermined area of the target at a given range according to a scaling of the reticle, such as inches of angle, centimeters of angle, or conventional scaling means as mentioned previously. The preferred arrangement of ghost ring 41 in combination with aiming dot 42 enhances the eye's natural tendency to center the ring 41 in the center of the field of view of the scope. By looking directly along the scope, the shooter is more likely to have accurate and repeatable shooting. The ghost ring 41 and dot 42 can be part of the reticle. Preferably ring 41 and dot 42 are etched onto one side of the disc 19. However, ring 41 and dot 42 can also be provided using other conventional methods such as, for example, printing or applying hairs or wires to disc 19, or to other optical components of the scope. Preferably aiming marking 42 is etched onto one side of the disc 19, but it can also be provided using other conventional methods such as, for example, printing or applying hairs or wires to disc 19 or to other optical components of the scope.

One skilled in the art will recognize at once that it would be possible to construct the present invention from a variety of materials and in a variety of different ways. While the preferred embodiments have been described in detail, and shown in the accompanying drawings, it will be evident that various further modification are possible without departing from the scope of the invention as set forth in the appended claims.

We claim:

1. A hand-held electronic ballistics calculator for use by a sport shooter with a firearm having a barrel for firing a predetermined cartridge containing a bullet, said firearm equipped with a telescopic gunsight mounted adjacent to said barrel, said gunsight including an aiming reticle, said hand-held electronic ballistics calculator for accurately computing targeting information needed to hit a target at a known range comprising:

(a) a lightweight, hand-held computing device including a controller, memory, a means for inputting data, a means for displaying information, and a portable power source for powering the device;

(b) a ballistics computer program installed in said memory for generating output needed to correctly aim the weapon at a target of known range using the aiming reticle of the gunsight, said program requiring the shooter to input in response to queries information regarding external conditions, information regarding the firearm and cartridge being used, and information regarding the range to, and movement of, the target, and wherein said information regarding the firearm and cartridge includes: the kind of telescopic gunsight being used; a distance between an optical center of the telescopic gunsight and an axial center of the barrel; bullet weight; ballistic coefficient of the bullet; muzzle velocity of the cartridge; and zero range for the firearm.

2. The ballistics calculator of claim 1 wherein said external conditions include temperature, windspeed and wind direction.

3. The ballistics calculator of claim 2 wherein said external conditions additionally include the slope of the ground over which the bullet will be fired.

4. The ballistics calculator of claim 2 wherein said external conditions additionally include barometric pressure and relative humidity.

5. The ballistics calculator of claim 4 wherein said barometric pressure and relative humidity are estimated by the program using altitude in combination with temperature.

6. The ballistics calculator of claim 1 wherein said type of telescopic gunsight being used is a conventional gunsight using as au aiming point an intersection of a primary vertical cross-hair and a primary horizontal cross-hair positioned at the optical center of the telescopic gunsight, and wherein said output consists of the number of clicks an elevation knob and a windage knob must be turned to adjust the position of said gunsight relative to said gun barrel so that said intersection of said primary vertical cross-hair and said primary horizontal cross-hair can be used as the aiming point for striking said target.

7. The ballistics calculator of claim 1 wherein said type of telescopic gunsight being used has a reticle mounted in a housing of said gunsight between an objective lens and an ocular lens, said reticle having an optical center, rangefinding markings, and a plurality of reference points, said reference points formed by a primary vertical cross-hair intersecting said optical center, a primary horizontal cross-hair intersecting said primary vertical cross-hair, a plurality of secondary horizontal cross-hairs intersecting said primary vertical cross hair and evenly spaced a predetermined distance along said primary vertical cross-hair, at least some of said horizontal cross-hairs marked for identification, a plurality of secondary vertical cross-hairs intersecting at least some of said secondary horizontal cross-hairs and evenly spaced a predetermined distance along at least some of said secondary horizontal cross-hairs, and wherein said output uses said horizontal cross-hairs and said secondary vertical cross-hairs to identify an point for hitting the target.

8. The ballistics calculator of claim 7 wherein said means for displaying information is a computer display screen.

9. The ballistics calculator of claim 8 wherein said output is a picture of said reticle on said computer display screen showing the exact position of said aiming point.

10. The ballistics calculator of claim 1 wherein said portable power source is a battery.

11. A method for using a hand-held electronic ballistics calculator with a firearm having a gun barrel for Sing a predetermined cartridge containing a bullet, said firearm equipped with a telescopic gunsight mounted adjacent to said barrel, said gunsight including an aiming reticle, said hand-held electronic ballistics calculator for accurately computing targeting information needed to hit a target at a known range wherein the calculator includes a lightweight, hand-held computing device including a controller, memory; a means for inputting data; a means for displaying information, and a portable power source for powering the device and a ballistics computer program installed in said memory for generating output needed to correctly aim the weapon at a target of known range using the aiming reticle of the gunsight, the program requiring the shooter to input in response to queries information regarding external conditions, information regarding the firearm and cartridge being used, and information regarding the range to, and movement of, the target, and wherein said information regarding the firearm and cartridge includes: the kind of telescopic gunsight being used; a distance between an optical center of the telescopic gunsight and an axial center of the barrel; bullet weight; ballistic coefficient of the bullet; muzzle velocity of the cartridge; and zero range for the firearm, the method comprising the steps of:

zeroing the firearm at a known first range so that the intersection of a vertical cross-hair and a primary horizontal cross-hair of the aiming reticle serves as a correct aiming point for any target at said first range;

inputting data regarding external conditions in response to queries by the program;

inputting data regarding the telescopic gunsight, the range at which the firearm was zeroed, bullet weight, ballistic coefficient, muzzle velocity, and height of the telescopic gunsight above the barrel in response to queries by the program, locating a target;

determining distance to the target using a rangefinder;

inputting the distance to target in response to a query by the program; and, using the aiming point information output by the program to the means for displaying for using the reticle of the gunsight to correctly aim the firearm so as to hit the target.

12. The method of claim 11 wherein said external conditions include temperature, barometric pressure, relative humidity, windspeed, wind direction, ground slope, and speed of the target.

13. The method of claim 12 wherein temperature and altitude are input in response to queries by the program and are aged by the program to estimate barometric pressure and relative humidity.

14. The method of claim 11 wherein said aiming point information is the number of clicks elevation and windage knobs on the telescopic gunsight must be moved to realign the position of the telescopic gunsight relative to the gun barrel whereby the intersection of the vertical and primary horizontal cross-hair forms the correct aiming point for the target.

15. The method of claim 11 wherein the reticle of the gunsight additionally includes a plurality of secondary horizontal cross-hairs intersecting said primary vertical cross hair and evenly spaced a predetermined distance along said primary vertical cross-hair, at least some of said horizontal cross-hairs marked for identification, a plurality of secondary vertical cross-hairs intersecting at least some of said secondary horizontal cross-hairs and evenly spaced a predetermined distance along at least some of said secondary horizontal cross-hairs, and wherein said aiming point information output by the program identifies a correct aiming point on the reticle for hitting the target using the horizontal cross-hair markings and the secondary vertical cross-hairs to map the aiming point on the reticle.

16. The method of claim 15 wherein the output is a picture on a computer display of the reticle showing the exact location of the aiming point.

* * * * *

UNITED STATES PATENT AND TRADEMARK OFFICE
CERTIFICATE OF CORRECTION

PATENT NO.    : 6,516,699 B2
DATED         : February 11, 2003
INVENTOR(S)   : Dennis J. Sammut and Dickenson Buell It is certified that error appears in the above-identified patent and that said Letters Patent is hereby corrected as shown below:

Column 21,
Line 57, please delete "au" and insert -- an --.

Column 22,
Line 24, please delete "Sing" and insert -- firing --.

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,516,699 B2 | |
| APPLICATION NO. | : 09/882767 | |
| DATED | : February 11, 2003 | |
| INVENTOR(S) | : Sammut et al. | |

It is certified that error appears in the above-identified patent and that said Letters Patent is hereby corrected as shown below:

In the Claims:

Column 22, Lines 23-67, Claim 11 should read:

11. A method for using a hand-held electronic ballistics calculator with a firearm having a gun barrel for firing a predetermined cartridge containing a bullet, said firearm equipped with a telescopic gunsight mounted adjacent to said barrel, said gunsight including an aiming reticle, said hand-held electronic ballistics calculator for accurately computing targeting information needed to hit a target at a known range wherein the calculator includes a lightweight, hand-held computing device including a controller, memory; a means for inputting data; a means for displaying information, and a portable power source for powering the device and a ballistics computer program installed in said memory for generating output needed to correctly aim the weapon at a target of known range using the aiming reticle of the gunsight, the program requiring the shooter to input in response to queries information regarding external conditions, information regarding the firearm and cartridge being used, and information regarding the range to, and movement of, the target, and wherein said information regarding the firearm and cartridge includes: the kind of telescopic gunsight being used; a distance between an optical center of the telescopic gunsight and an axial center of the barrel; bullet weight ballistic coefficient of the bullet; muzzle velocity of the cartridge; and zero range for the firearm, the method comprising the steps of: zeroing the firearm at a known first range so that the intersection of a vertical cross-hair and a primary horizontal cross-hair of the aiming reticle serves as a correct aiming point for any target at said first range; inputting data regarding external conditions in response to queries by the program; inputting data regarding the telescopic gunsight, the range at which the firearm was zeroed, bullet weight, ballistic coefficient, muzzle velocity, and height of the telescopic gunsight above the barrel in response to queries by the program, locating a target; determining distance to the target using a rangefinder; inputting the distance to target in response to a query by the program; and, using the aiming point information output by the program to the means for displaying for using the reticle of the gunsight to correctly aim the firearm so as to hit the target. [[correct]]

Signed and Sealed this
Twenty-sixth Day of November, 2013

Margaret A. Focarino
*Commissioner for Patents of the United States Patent and Trademark Office*